(12) United States Patent
Yavercovski

(10) Patent No.: US 12,333,129 B1
(45) Date of Patent: Jun. 17, 2025

(54) METHODS AND SYSTEMS FOR GENERATING GRAPHICAL CONTENT THROUGH EASING AND PATHS

(71) Applicant: COREL CORPORATION, Ottawa (CA)

(72) Inventor: Michel Yavercovski, Olga, WA (US)

(73) Assignee: Corel Corporation, Ottawa (CA)

( * ) Notice: Subject to any disclaimer, the term of this patent is extended or adjusted under 35 U.S.C. 154(b) by 0 days.

(21) Appl. No.: 18/460,299

(22) Filed: Sep. 1, 2023

Related U.S. Application Data

(63) Continuation of application No. 17/821,923, filed on Aug. 24, 2022, now Pat. No. 11,775,159, which is a continuation of application No. 17/235,163, filed on Apr. 20, 2021, now Pat. No. 11,435,886.

(51) Int. Cl.
*G06F 3/048* (2013.01)
*G06F 3/04815* (2022.01)
*G06F 3/0482* (2013.01)
*G06F 3/04845* (2022.01)
*G06F 3/04847* (2022.01)
*G06N 20/00* (2019.01)
*G06F 3/04883* (2022.01)

(52) U.S. Cl.
CPC ...... *G06F 3/04845* (2013.01); *G06F 3/04815* (2013.01); *G06F 3/0482* (2013.01); *G06F 3/04847* (2013.01); *G06N 20/00* (2019.01); *G06F 3/04883* (2013.01)

(58) Field of Classification Search
None
See application file for complete search history.

(56) References Cited

U.S. PATENT DOCUMENTS

| | | | |
|---|---|---|---|
| 7,602,405 | B2 | 10/2009 | Hsu |
| 8,605,095 | B2 | 12/2013 | Diverdi et al. |
| 9,423,932 | B2 | 8/2016 | Kroupa et al. |
| 9,633,570 | B2 | 4/2017 | Peterson et al. |
| 10,068,355 | B2 | 9/2018 | Tremblay et al. |
| 10,083,525 | B2 | 9/2018 | Mantuano |
| 10,092,220 | B2 | 10/2018 | Mauro et al. |
| 10,317,989 | B2 | 6/2019 | Rouvinez et al. |
| 10,353,579 | B1 * | 7/2019 | Singer ................. G06F 3/0484 |

(Continued)

*Primary Examiner* — Hua Lu
(74) *Attorney, Agent, or Firm* — Rosenberg, Klein & Lee

(57) ABSTRACT

Digital image editors provide tools to modify or manipulate a digital image. For animation, video, etc. this manipulation and/or modification must be undertaken over a portion of the digital content's duration. This can represent tens, hundreds, thousands of equivalent images (i.e. each frame) to be modified and/or manipulated. The invention provides digital tools allowing effects, e.g. a manipulation and/or modification, from relatively simple transitions through to highly complex transitions, to be defined and then added to digital content. Further, these digital tools can be independent of considerations of the underlying content such that an effect designed with these digital tools may be applied over a still image, video content, animation etc. without requiring the user to define frames within the digital content etc. Further, the path and/or other characteristics of the modification and/or manipulation may be linked to other characteristics of the digital element, the digital content, external factors etc.

20 Claims, 12 Drawing Sheets

(56) References Cited

U.S. PATENT DOCUMENTS

| | | | |
|---|---|---|---|
| 10,600,220 B2 | 3/2020 | Choi et al. | |
| 10,602,133 B2 | 3/2020 | Valdivia et al. | |
| 10,972,360 B2 | 4/2021 | Cahill et al. | |
| 11,106,273 B2 | 8/2021 | Hazra et al. | |
| 11,449,212 B2 | 9/2022 | Roard et al. | |
| 11,494,991 B2 | 11/2022 | Spivack et al. | |
| 2007/0216684 A1* | 9/2007 | Hsu | G06T 11/60 345/441 |
| 2013/0120426 A1* | 5/2013 | DiVerdi | G06T 11/001 345/589 |
| 2014/0098023 A1* | 4/2014 | Zhai | G06F 3/04886 345/168 |
| 2014/0186816 A1* | 7/2014 | Peterson | G09B 7/02 434/362 |
| 2014/0304665 A1* | 10/2014 | Holz | G06F 3/017 715/863 |
| 2014/0380237 A1* | 12/2014 | Kroupa | G06F 3/04883 715/781 |
| 2016/0259491 A1* | 9/2016 | Jacobs | G06F 3/0482 |
| 2017/0086712 A1* | 3/2017 | Mauro | A61B 5/1101 |
| 2017/0123487 A1* | 5/2017 | Hazra | G06F 3/0482 |
| 2017/0262045 A1* | 9/2017 | Rouvinez | G06F 3/011 |
| 2017/0294032 A1* | 10/2017 | Mantuano | G06T 11/001 |
| 2017/0330351 A1* | 11/2017 | Tremblay | G06T 11/001 |
| 2018/0033173 A1* | 2/2018 | Choi | H04L 67/131 |
| 2018/0095616 A1* | 4/2018 | Valdivia | G06F 3/04847 |
| 2018/0253224 A1* | 9/2018 | Fransen | G06V 40/28 |
| 2019/0004698 A1* | 1/2019 | Harrison | G06F 3/04883 |
| 2019/0151882 A1* | 5/2019 | Tritt | B25J 13/089 |
| 2019/0318652 A1* | 10/2019 | Livingston | G09B 5/02 |
| 2019/0346985 A1* | 11/2019 | Roard | G06F 3/04817 |
| 2019/0349264 A1* | 11/2019 | Cahill | H04L 41/12 |
| 2020/0005026 A1* | 1/2020 | Andersen | A63F 13/428 |
| 2021/0011621 A1* | 1/2021 | Becker | G06F 3/04886 |
| 2021/0065060 A1* | 3/2021 | Minoya | G06N 3/088 |
| 2021/0074068 A1* | 3/2021 | Spivack | G06N 20/00 |
| 2021/0158630 A1* | 5/2021 | Muhammad | G06F 3/017 |
| 2022/0004263 A1* | 1/2022 | Krichenbauer | G06N 3/02 |

* cited by examiner

METHODS AND SYSTEMS FOR GENERATING GRAPHICAL CONTENT THROUGH EASING AND PATHS

CROSS-REFERENCE TO RELATED APPLICATIONS

This application claims the benefit of priority as a continuation patent application of U.S. patent application Ser. No. 17/821,923 filed Aug. 24, 2022; which itself claims the benefit of priority as a continuation patent application of U.S. patent application Ser. No. 17/235,163 filed Apr. 20, 2021 which has issued as U.S. Pat. No. 11,435,886; the entire contents of each being incorporated herein by reference.

FIELD OF THE INVENTION

This invention relates to digital imagery and more particularly to generating graphical content by associating one or more aspects of the graphical content with a path and/or an casing associated with the path where the path and/or casing represent a relationship between one or more parameters of the graphical content and one or more other parameters of the graphical content.

BACKGROUND OF THE INVENTION

Within digital graphics and digital image editors a user may employ a virtual "paintbrush" (also referred to herein as a "brush", "brush tool", or mark making tool) to modify or manipulate a digital image by depositing virtual paint or virtual ink. However, within other forms of digital content such as animation, video, etc. the manipulation and/or modification will typically occur over a portion of the digital content's duration, representing a period of time that the manipulation and/or modification is applicable for. This may be defined within the digital content editor, e.g. a digital video editor or animation software for example, before a final rendered output is generated for distribution such as on demand, downloading, or streaming for example.

Accordingly, the manipulation and/or modification must be established at a starting point within the digital content, have a defined end point within the digital content and a defined transition from the start to the end point. Within the prior art tools for adding animated text etc. have been established to ease the task of the user. However, these effects are pre-defined. Accordingly, it would be beneficial to provide users with digital tools allowing them to generate an effect, e.g. a manipulation and/or modification, which they can define, from those with relatively simple transitions through to highly complex transitions, and then add to digital content. It would be further beneficial for the digital tools to be independent of considerations of the underlying content such that an effect designed with these digital tools may be applied over a still image, video content, animation etc. without requiring the user to define frames within the digital content etc.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to address limitations within the prior art relating to digital imagery and more particularly to generating graphical content by associating one or more aspects of the graphical content with a path and/or an easing associated with the path where the path and/or easing represent a relationship between one or more parameters of the graphical content and one or more other parameters of the graphical content.

In accordance with an embodiment of the invention there is provided a computer executable instructions stored upon a non-volatile, non-transitory storage medium where the executable instructions when executed by one or more processors of a system configure the system to execute a process comprising:
  defining a path within a virtual space to be associated with a digital element;
  defining an easing associated with the path;
  associating the digital element, the path and easing with an item of digital content; and
  rendering the digital element within the item of digital content where the digital element is at least one of modified and manipulated in dependence upon the path and easing.

In accordance with an embodiment of the invention there is provided a method comprising:
  defining within a software application in execution upon an electronic device a path within a virtual space to be associated with a digital element;
  defining within the software application in execution upon the electronic device an easing associated with the path;
  associating with the software application in execution upon the electronic device the digital element, the path and easing with an item of digital content; and
  rendering the digital element within the item of digital content where the digital element is at least one of modified and manipulated in dependence upon the path and easing.

In accordance with an embodiment of the invention there is provided a system comprising:
  a processor;
  a non-transitory, non-volatile memory, the memory for storing executable instructions; and
  a display; wherein
  the executable instructions when executed by the processor of the system configure the system to execute a process comprising:
    defining a path within a virtual space to be associated with a digital element;
    defining an easing associated with the path;
    associating the digital element, the path and easing with an item of digital content; and
    rendering upon the display the digital element within the item of digital content where the digital element is at least one of modified and manipulated in dependence upon the path and easing.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1A:
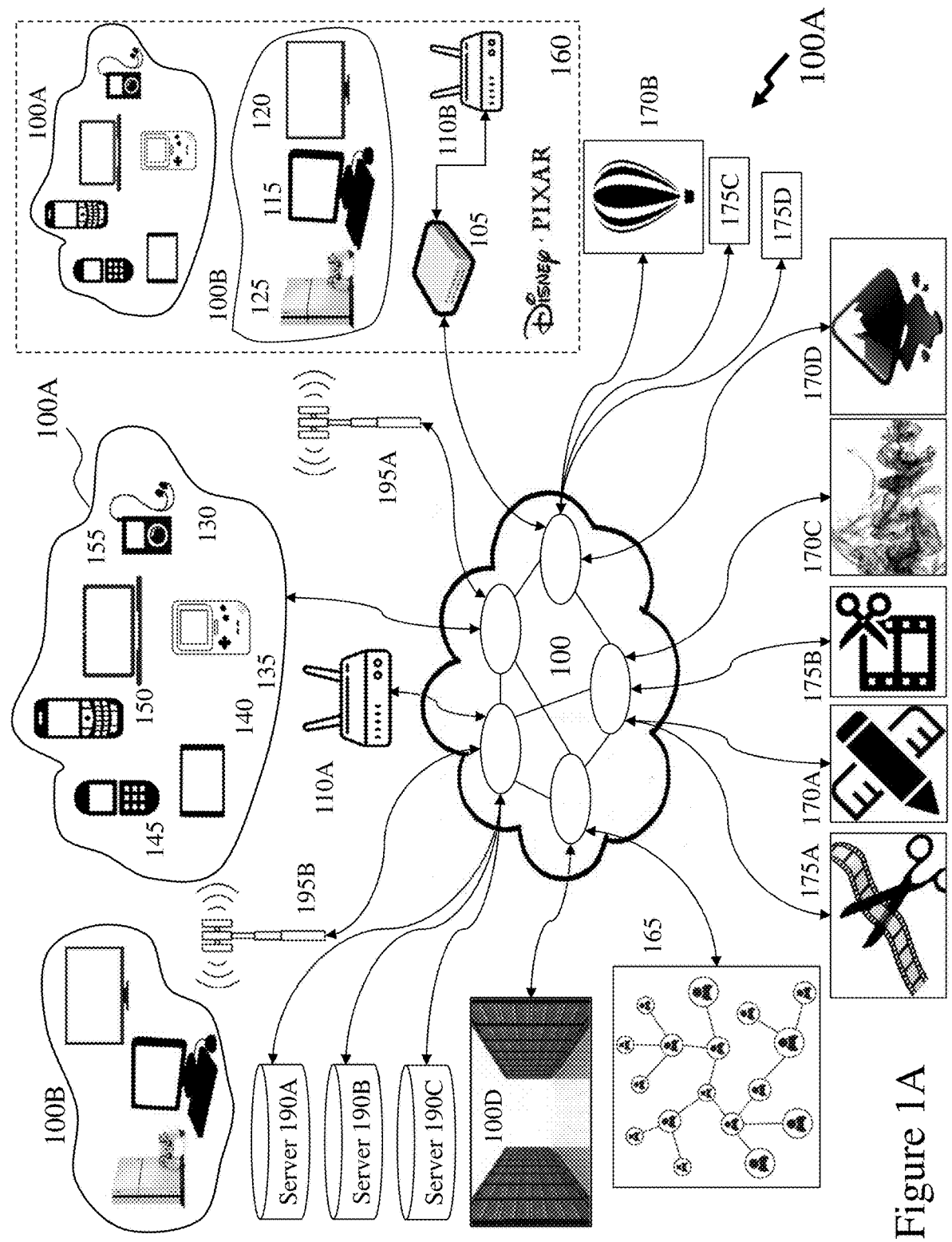
FIG. 1A depicts a network environment within which embodiments of the invention may be employed;
}

The present invention is directed to digital imagery and more particularly to generating graphical content by associating one or more aspects of the graphical content with a path and/or an easing associated with the path where the path and/or easing represent a relationship between one or more parameters of the graphical content and one or more other parameters of the graphical content.

The ensuing description provides exemplary embodiment(s) only, and is not intended to limit the scope, applicability, or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "software application", also referred to as an "application" or "app", as used herein may refer to, but is not limited to, a "standalone software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A "third party" or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals exploiting a software application providing a graphics editing system and/or graphics editing application/platform (GESGEAP) implementing one or more embodiments of the invention. This includes, but is not limited to, private individuals, employees of organizations and/or enterprises, members of community organizations, members of charity organizations, men, women, children, teenagers, and animals. In its broadest sense the user may further include, but not be limited to, software systems, mechanical systems, robotic systems, android systems, etc. that may be characterised by providing a gesture or data relating to a gesture to a software application providing a graphics editing system and/or graphics editing application/platform (GESGEAP) implementing one or more embodiments of the invention.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed, or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is capable of being at least one of generated, selected, created, modified, and transmitted with a software application allowing a user of the software application to generate, select, create, modify, and edit visual and/or audiovisual content within the digital content.

Reference to a "document" as used herein may refer to, but is not limited to, any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.). In the context of the Internet, a common document is a Web page. Web pages often include content and may include embedded information (such as meta-information, hyperlinks, etc.) and/or embedded instructions (such as Javascript, etc.). In many cases, a document has a unique, addressable, storage location and can therefore be uniquely identified by this addressable location such as a universal resource locator (URL) for example used as a unique address used to access information on the Internet. "Document information" as used herein may refer to, but is not limited to, may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

A "mark making tool", also referred to as a "mark tool" or "marking tool", as used herein may refer to, a tool for applying a visual effect to a graphics image within a software application including, for example, a graphics generating tool, a graphics editing tool, and an image processing tool. Accordingly, a mark making tool may simulate real and unreal systems for the application, removal, or modification of information including, but not limited to, colour, texture, and content to a graphics image. As such a mark making tool may include, but is not limited to, a brush, an air brush, a pen, a pencil, a nib, a spray can, a sprayer, a sponge, a knife, a mathematical algorithm, a physical system of elements obeying physical laws, and a physical system obeying non-physical laws.

A "brush stroke" or "stroke", as used herein may refer to, but is not limited to a class of mark making tools that simulate physical brushes for applying a medium, e.g. oil, watercolour, acrylic, onto a canvas, document, or other surface. A stroke may alternatively be simulating other physical medium application techniques including, but not limited, to airbrushes, chalk, markers, palette knives and spongers for example. Accordingly, within this description the term brush is not limited to a physical brush but should be interpreted as meaning a tool to apply a medium to a surface.

A "brush engine", as used herein may refer to, a module or modules forming part of a graphics software application which generates brush strokes within the graphics software application to render the brush strokes upon the virtual canvas or other surface to which the brush stroke(s) are applied.

A "gesture", also referred to as a "motion" or "input", as used herein may refer to, an action by a user resulting in the movement and/or action of a mark making tool relative to a graphics image within a software application including, for example, a graphics generating tool, a graphics editing tool, and an image processing tool. As such a gesture may include, but not be limited to, a swipe, a tap, a motion, a press, and a click captured by the software application through an interface including, but not limited to, image processing, image capture, audio command, a user interface, and a haptic interface.

A "gesture characteristic", also referred to as a "gesture expression" or an "expression", as used herein may refer to an aspect of a gesture of a user or setting exploited within a software application to modify a value relating to a mark making tool within the software application. As such as a gesture characteristic or expression may include, but not be limited, to velocity, direction, pressure, wheel, tilt, bearing, rotation, source of the gesture, and random. A source of the gesture may include, but not be limited to, a touchpad, a stylus, a mouse, keypad, keyboard, accelerometer, or accelerometer derived data, tracked motion of a user or a predetermined portion of a user, an external image source, an external audiovisual source, an external multimedia source, biometric data of a user, and an item of environmental data. An expression or gesture characteristic may be applied to one or more behaviours/aspects of a mark making tool including, but not limited to, global chaos, local chaos, smoothness, damping, jitter, number, count, weighting, force, direction, mapping, colour, colour variability, resaturation, bleed, feature, grain, concentration, setting rate, viscosity, wetness, opacity, and hardness.

A "user interface", also referred to as a "controller" or "haptic interface", as used herein may refer to a device and/or system capturing one or more actions of a user and providing these to a software application. Accordingly, a user interface may include an image capture/processing system, a gesture recognition system, a stylus, a wearable device, a touchscreen, a keypad, a mouse, a touchpad, a tablet, an accelerometer, and a motion recognition system.

"Stroke tapestry" or a "stroke tapestry", as used herein refers to, but is not limited to, a software feature or a result of a software feature within a graphics editing system and/or graphics editing application/platform (GESGEAP) wherein an area of graphical content is automatically filled using a series of strokes generated by the GESGEAP.

A "software engine" (engine) as used herein refers to, but is not limited to, a piece of software providing an encapsulated block of functionality.

A "spooler" as used herein refers to, but is not limited to, a software component of a GESGEAP which processes stroke data, such as physical coordinates, and expression (gesture characteristic) data to generate a stroke.

A "particle brush" as used herein refers to, but is not limited to, a mark making tool that exploits physical interactions which are applied to a series of particles emitted from a predetermined point, e.g. the centre of the mark making tool, such that the particles draw a pattern of lines (paths) as they cross the working area (e.g. screen or virtual canvas) where their motion is constrained by a physical effect where the physical effect can be defined through configurable parameters and/or gesture characteristics. Such physical effects may include, but are not limited to, physical systems obeying physical laws such as springs (e.g. radial, ring or mesh configurations of particles joined by virtual springs), gravity, electrostatics, magnetics, etc. or physical systems obeying non-physical laws, which may for example be defined mathematically.

A "digital element" as used herein refers to, but is not limited to, an item of digital content such as a digital image, a digital animation, a brush stroke, a stroke tapestry, digital video, etc. which can be manipulated and/or modified using a GESGEAP according to embodiments of the invention. The digital element may be stored within a memory accessible to the GESGEAP for retrieval and use or it may be generated in an initial step of establishing the manipulation and/or modification. The digital element may be generated and stored without any defined timing or timebase so that the digital element may be applied to the digital content and its duration may accordingly be part of the manipulation and/or modification of the digital element within the GESGEAP according to embodiments of the invention for generating the digital effect being added to the original digital content.

Referring to FIG. 1A there is depicted a Network Environment 100A within which embodiments of the invention may be employed supporting graphics editing systems and graphics editing applications/platforms (GESGEAPs) according to embodiments of the invention. Such GESGEAPs, for example including digital graphics editor and digital painting applications. As shown first and second user groups 100A and 100B respectively interface to a telecommunications Network 100. Within the representative telecommunication architecture a remote central exchange 180 communicates with the remainder of a telecommunication service providers network via the Network 100 which may include for example long-haul OC-48/OC-192 backbone elements, an OC-48 wide area network (WAN), a Passive Optical Network, and a Wireless Link. The central exchange 180 is connected via the Network 100 to local, regional, and international exchanges (not shown for clarity) and therein through Network 100 to first and second cellular APs 195A and 195B respectively which provide Wi-Fi cells for first and second user groups 100A and 100B, respectively. Also connected to the Network 100 are first and second Wi-Fi nodes 110A and 110B, the latter of which being coupled to Network 100 via router 105. Second Wi-Fi node 110B is associated with Enterprise 160, e.g. Disney Pixar™, within which are other first and second user groups 100A and 100B. Second user group 100B may also be connected to the Network 100 via wired interfaces including, but not limited to, DSL, Dial-Up, DOCSIS, Ethernet, G.hn, ISDN, MoCA, PON, and Power line communication (PLC) which may or may not be routed through a router such as router 105.

Within the cell associated with first AP 110A the first group of users 100A may employ a variety of PEDs including for example, laptop computer 155, portable gaming console 135, tablet computer 140, smartphone 150, cellular telephone 145 as well as portable multimedia player 130. Within the cell associated with second AP 110B are the second group of users 100B which may employ a variety of FEDs including for example gaming console 125, personal computer 115 and wireless/Internet enabled television 120 as well as cable modem 105. First and second cellular APs 195A and 195B respectively provide, for example, cellular GSM (Global System for Mobile Communications) telephony services as well as 3G and 4G evolved services with enhanced data transport support. Second cellular AP 195B provides coverage in the exemplary embodiment to first and second user groups 100A and 100B. Alternatively the first and second user groups 100A and 100B may be geographically disparate and access the Network 100 through multiple APs, not shown for clarity, distributed geographically by the network operator or operators. First cellular AP 195A as show provides coverage to first user group 100A and environment 170, which comprises second user group 100B as well as first user group 100A. Accordingly, the first and second user groups 100A and 100B may according to their particular communications interfaces communicate to the Network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly portable electronic devices within first user group 100A may form associations either through standards such as IEEE 802.15 or Bluetooth as well in an ad-hoc manner.

Also connected to the Network 100 are Social Networks (SOCNETS) 165, first and second graphics editors 170A and 170B respectively, e.g. Corel™ Painter™ and Adobe™ Illustrator, first and second web based graphic editors 170C and 170D respectively, e.g. PhotoCommander™ and FatPaint™, and first and second video editing tools 175A and 175B respectively, e.g. Corel™ MobileStudio™ and Cinnerla™, first and second graphics tools 175C and 175D as well as first to third servers 190A to 190C respectively which together with others, not shown for clarity. First to third servers 190A to 190C respectively may host according to embodiments of the inventions multiple services associated with a provider of graphics editing systems and graphics editing applications/platforms (GESGEAPs); a provider of a SOCNET or Social Media (SOME) exploiting GESGEAP features; a provider of a SOCNET and/or SOME not exploiting GESGEAP features; a provider of services to PEDS and/or FEDS; a provider of one or more aspects of wired and/or wireless communications; an Enterprise 160 exploiting GESGEAP features; license databases; content databases; image databases; content libraries; customer databases; websites; and software applications for download to or access by FEDs and/or PEDs exploiting and/or hosting GESGEAP features. First to third servers 190A to 190C respectively may also host for example other Internet services such as a search engine, financial services, third party applications and other Internet based services.

Accordingly, a graphics designer and/or user (GRADUS or user) may exploit a PED and/or FED within an Enterprise 160, for example, and access one of the first or second primary content servers 190A and 190B respectively to perform an operation such as accessing/downloading an application which provides GESGEAP features according to embodiments of the invention; execute an application already installed providing GESGEAP features; execute a web based application providing GESGEAP features; or access content. Similarly, a GRADUS may undertake such actions or others exploiting embodiments of the invention exploiting a PED or FED within first and second user groups 100A and 100B respectively via one of first and second cellular APs 195A and 195B respectively and first Wi-Fi nodes 110A.

Figure 1B:
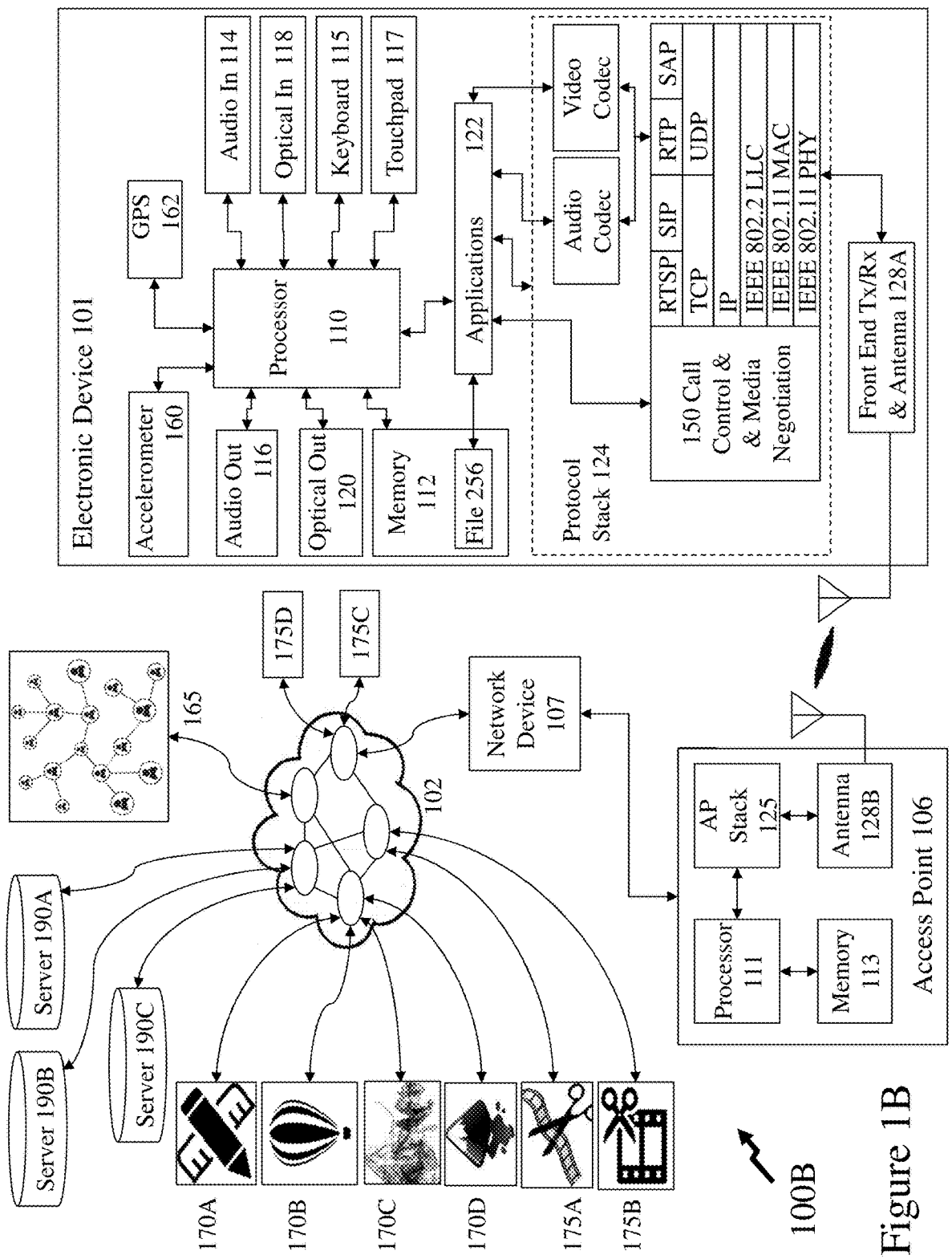
FIG. 1B depicts a wireless portable electronic device supporting communications to a network such as depicted in FIG. 1A and as supporting embodiments of the invention.

Now referring to FIG. 1B there is depicted a Schematic 100B of a network to which an Electronic Device 101 supporting graphics editing systems and graphics editing applications/platforms (GESGEAPs) and GESGEAP features according to embodiments of the invention is connected. Electronic Device 101 may, for example, be a PED, a FED, or a wearable device and may include additional elements above and beyond those described and depicted. Also depicted in conjunction with the Electronic Device 101 are exemplary internal and/or external elements forming part of a simplified functional diagram of an Electronic Device 101 within an overall simplified schematic of a system supporting SAP features according to embodiments of the invention which include includes an Access Point (AP) 106, such as a Wi-Fi AP for example, a Network Device 107, such as a communication server, streaming media server, and a router. The Network Device 107 may be coupled to the AP 106 via any combination of networks, wired, wireless and/or optical communication links. Also connected to the Network 102 are Social Media Networks (SOCNETS) 165; first and second remote systems 170A and 170B respectively; first and second websites 175A and 175B respectively; first and third 3rd party service providers 175C and 175E respectively; and first to third servers 190A to 190C, respectively.

The Electronic Device 101 includes one or more Processors 110 and a Memory 112 coupled to Processor(s) 110. AP 106 also includes one or more Processors 111 and a Memory 113 coupled to Processor(s) 210. A non-exhaustive list of examples for any of Processors 110 and 111 includes a central processing unit (CPU), a digital signal processor (DSP), a reduced instruction set computer (RISC), a complex instruction set computer (CISC), a graphics processing unit (GPU) and the like. Furthermore, any of Processors 110 and 111 may be part of application specific integrated circuits (ASICs) or may be a part of application specific standard products (ASSPs). A non-exhaustive list of examples for Memories 112 and 113 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic Device 101 may include an audio input element 214, for example a microphone, and an Audio Output Element 116, for example, a speaker, coupled to any of Processor(s) 110. Electronic Device 101 may include an Optical Input Element 218, for example, a video camera or camera, and an Optical Output Element 220, for example an LCD display, coupled to any of Processor(s) 110. Electronic Device 101 also includes a Keyboard 115 and Touchpad 117 which may for example be a physical keyboard and touchpad allowing the user to enter content or select functions within one of more Applications 122. Alternatively, the Keyboard 115 and Touchpad 117 may be predetermined regions of a touch sensitive element forming part of the display within the Electronic Device 101. The one or more Applications 122 that are typically stored in Memory 112 and are executable by any combination of Processor(s) 110. Electronic Device 101 also includes Accelerometer 160 providing three-dimensional motion input to the Processor(s) 110 and GPS 162 which provides geographical location information to Processor(s) 110.

Electronic Device 101 includes a Protocol Stack 124 and AP 106 includes an AP Stack 125. Within Protocol Stack 124 is shown an IEEE 802.11 protocol stack but alternatively may exploit other protocol stacks such as an Internet Engineering Task Force (IETF) multimedia protocol stack for example or another protocol stack. Likewise, AP Stack 125 exploits a protocol stack but is not expanded for clarity. Elements of Protocol Stack 124 and AP Stack 125 may be implemented in any combination of software, firmware and/or hardware. Protocol Stack 124 includes an IEEE 802.11-compatible PHY module that is coupled to one or more Tx/Rx & Antenna Circuits 128A and an IEEE 802.11-compatible MAC module which is coupled to an IEEE 802.2-compatible LLC module. Protocol Stack 124 also includes modules for Network Layer IP, a transport layer User Datagram Protocol (UDP), a transport layer Transmission Control Protocol (TCP), a session layer Real Time Transport Protocol (RTP), a Session Announcement Protocol (SAP), a Session Initiation Protocol (SIP) and a Real Time Streaming Protocol (RTSP). Protocol Stack 124 includes a presentation layer Call Control and Media Negotiation module 150, one or more audio codecs and one or more video codecs. Applications 122 may be able to create maintain and/or terminate communication sessions with the Network Device 107 by way of AP 106 and therein via the Network 102 to one or more of Social Networks (SOCNETS) 165; first and second graphics editors 170A and 170B respectively, e.g. Corel™ Painter™ and Adobe™ Illustrator, first and second web based graphic editors 170C and 170D respectively, e.g. PhotoCommander™ and FatPaint™, and first and second video editing tools 175A and 175B respectively, e.g. Corel™ MobileStudio™ and Cinnerla™, first and second graphics tools 175C and 175D as well as first to third servers 190A to 190C respectively which together with others, not shown for clarity.

Typically, Applications 122 may activate any of the SAP, SIP, RTSP, and Call Control & Media Negotiation 150 modules for that purpose. Typically, information may propagate from the SAP, SIP, RTSP, Call Control & Media Negotiation 150 to the PHY module via the TCP module, IP module, LLC module and MAC module. It would be apparent to one skilled in the art that elements of the Electronic Device 101 may also be implemented within the AP 106 including but not limited to one or more elements of the Protocol Stack 124, including for example an IEEE 802.11-compatible PHY module, an IEEE 802.11-compatible MAC module, and an IEEE 802.2-compatible LLC module. The AP 106 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, and a call control & media negotiation module. Portable electronic devices (PEDs) and fixed electronic devices (FEDs) represented by Electronic Device 101 may include one or more additional wireless or wired interfaces in addition to or in replacement of the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1010, DSL, Dial-Up, DOCSIS, Ethernet, G.hn, ISDN, MoCA, PON, and Power line communication (PLC).

The Front End Tx/Rx & Antenna 128A wirelessly connects the Electronic Device 101 with the Antenna 128B on Access Point 206, wherein the Electronic Device 101 may support, for example, a national wireless standard such as GSM together with one or more local and/or personal area wireless protocols such as IEEE 802.11 a/b/g Wi-Fi, IEEE 802.16 WiMAX, and IEEE 802.15 Bluetooth for example. Accordingly, it would be evident to one skilled the art that the Electronic Device 101 may accordingly download original software and/or revisions for a variety of functions. In some embodiments of the invention the functions may not be implemented within the original as sold Electronic Device 101 and are only activated through a software/firmware revision and/or upgrade either discretely or in combination with a subscription or subscription upgrade for example. Accordingly, as will become evident in respect of the description below the Electronic Device 101 may provide a user with access to one or more GESGEAP including, but not limited to, software installed upon the Electronic Device 101 or software installed upon one or more remote systems such as those associated with Social Networks (SOCNETS) 165; first and second graphics editors 170A and 170B respectively, e.g. Corel™ Painter™ and Adobe™ Illustrator, first and second web based graphic editors 170C and 170D respectively, e.g. PhotoCommander™ and FatPaint™, and first and second video editing tools 175A and 175B respectively, e.g. Corel™ MobileStudio™ and Cinnerla™, first and second graphics tools 175C and 175D as well as first to third servers 190A to 190C respectively.

Figure 1C:
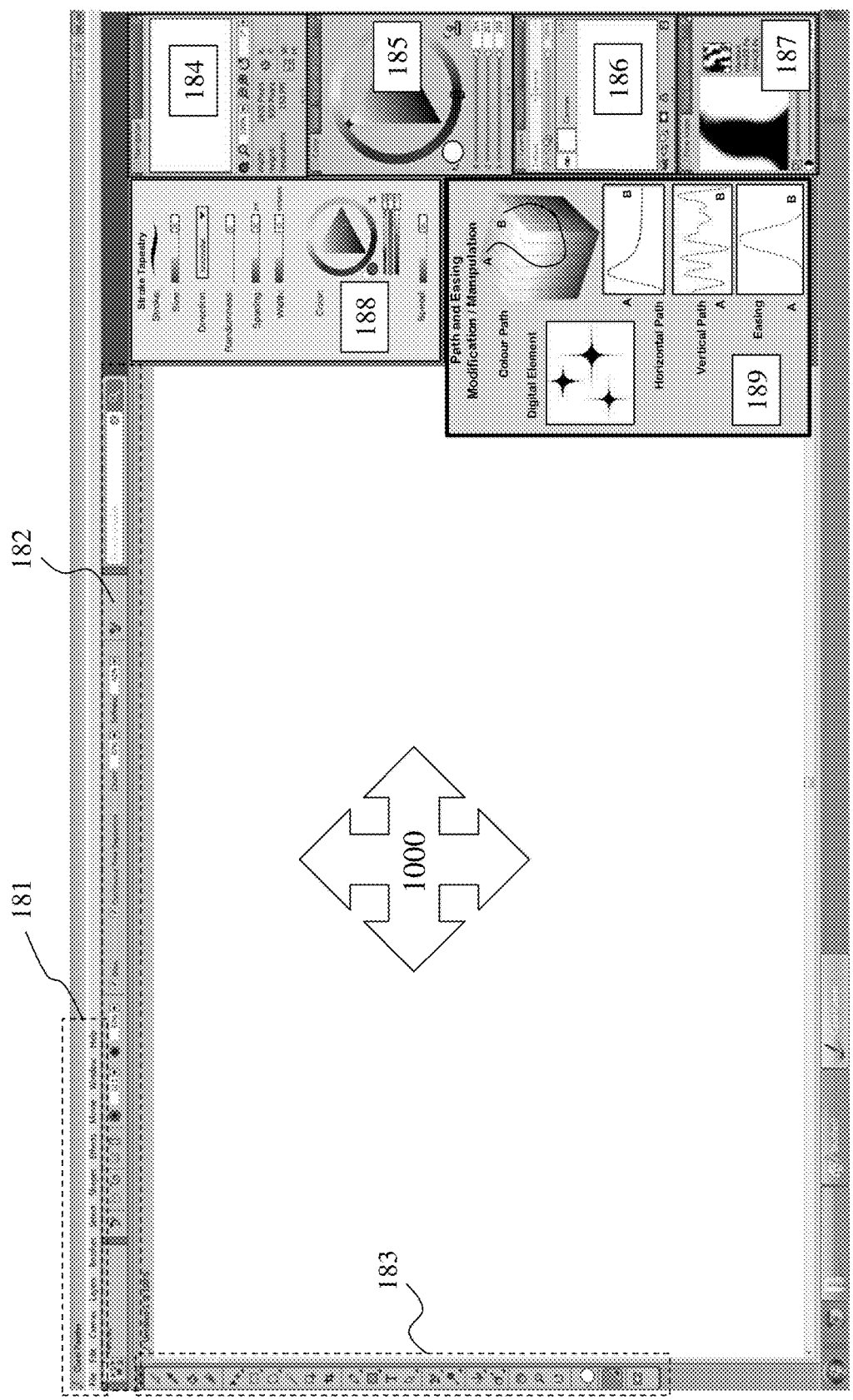
FIG. 1C depicts home screen of a graphics editing system and/or graphics editing application/platform (GESGEAP) implementing one or more embodiments of the invention.

Now referring to FIG. 1C there is depicted a Home Screen 100C of a digital graphics editor, digital painting, application, the GESGEAP, according to an embodiment of the invention, e.g. Corel™ Painter™. Accordingly, within the Home Screen 100C a user has opened a Window 1000, which may for example be untextured, textured to mimic a paper, canvas, or other surface for "painting." Optionally, a texture may be applied prior to the user beginning work, during their work, or upon its completion. Similarly, other effects may be added by the user through the Menu Bar 181 including employing multiple layers with different effects and/or properties, different illuminations, etc. as known within the art. The user may also be resented with a series of menus that can be manipulated, docked, undocked, and moved with respect to the Home Screen 100C and allowing the user to select, adjust, modify, add, delete, and control various aspects of their interaction with the GESGEAP. These include, but are not limited to:

Mark Making Tool Selector and Settings 182;
Main Feature Menu 183;
Canvas Navigator Menu 184;
Colour Menu 185, for the overall application;
Layer/Channel Management Menu 186
Flow Mapping Menu 187, which allows an underlying mapping to be applied to effects although actual flow map employed is itself not rendered;
Stroke Tapestry Menu 188, which allows an area to be automatically filled based upon the settings within the menu; and
Path and Easing Menu 189.

Accordingly, within the embodiments of the invention described below and in respect of FIGS. 2 to 10 a user may select features and functionalities according to embodiments of the invention and establish aspects of these at different settings through such menus and others as would be evident to one of skill in the art. Within the following descriptions a digital element may include, but not be limited to:

a brush stroke;
an impression or series of impressions of a mark making tool;
a particle brush;
a stroke tapestry;
a digital image;
a digital animation;
digital video content;
digital audio content;
digital audiovisual content; and
digital text content.

Whilst within the following descriptions reference is made to a brush stroke, being one form of mark making tool easily visualized by the reader of this specification, it would be apparent to one of skill in the art that whilst the concepts may be described and depicted with respect to brush strokes and brush mark making tools the methods and systems described may be applied to other mark making tools. For example, such mark making tools which may exploit embodiments of the invention may be provided within different categories of mark making tools including, but not limited to, airbrushes, chalks, gels, gouache, impasto, markers, palette knives, watercolour, and sponges.

Whilst within the following descriptions reference is made to a digital image as being one form of digital content easily visualized by the reader of this specification, it would be apparent to one of skill in the art that whilst the concepts may be described and depicted with respect to an image or element of text that the methods and systems described may be applied to rendered images of mark making tools, a brush stroke, an impression or series of impressions of a mark making tool, a particle brush, a stroke tapestry, a digital animation, digital video content, digital audio audiovisual content, digital text content, and digital content.

It would be evident that the Path and Easing Menu 189 in FIG. 1C is an exemplary schematic of a GUI menu presented to a user of a GESGEAP exploiting embodiments of the invention such as a digital graphics software application or a digital animation software application, for example. As depicted the Path and Easing Menu 189 provides visually to the user:

Colour Path: this being a "trajectory" of the colour of the digital element from a starting position "A" to a final position "B" such that as will become evident in the following description the colour of the digital element may vary according to the position of the digital element along the "physical" path across the Window 1000 or across the Canvas the user is working upon where the Window 1000 represents that portion of the Canvas currently being viewed.

Digital Element: representing an icon denoting the digital element being manipulated and/or modified which as noted above may be an image, an icon, text, etc.

Horizontal Path: representing the lateral displacement on the Canvas of the digital element from the beginning of the path "A" to the end of the path "B"

Vertical Path: representing the vertical displacement on the Canvas of the digital element from the beginning of the path "A" to the end of the path "B".

Easing: representing the velocity of modification and/or manipulation on the Canvas of the digital element from the beginning of the path "A" to the end of the path "B".

Within embodiments of the invention the user may establish elements such as Horizontal Path, Vertical Path and Easing, for example, by establishing them through a menu, such as Path and Easing Menu 189, and/or through a haptic interface or user interface. For example, one user may be comfortable defining functions and/or shapes and/or geometries within a menu with their associated parameters whilst another may be more comfortable defining these elements through their motion of a stylus or tracking motion of their hand etc. In either scenario the representative elements may be manipulated by the user through a menu, such as Path and Easing Menu 189, or their actions. For example, a user may play a portion of an item of digital content within which a digital element is modified and manipulated by the settings established by the user. The user may adjust the settings through the menu or the GESGEAP may be configured to take user input from a haptic interface or user interface as control input to adjust the settings. Accordingly, the user, as the path/easing are being "played" or rendered to the user, can manipulate the path/easing aspects as it is rendered.

Figure 2:
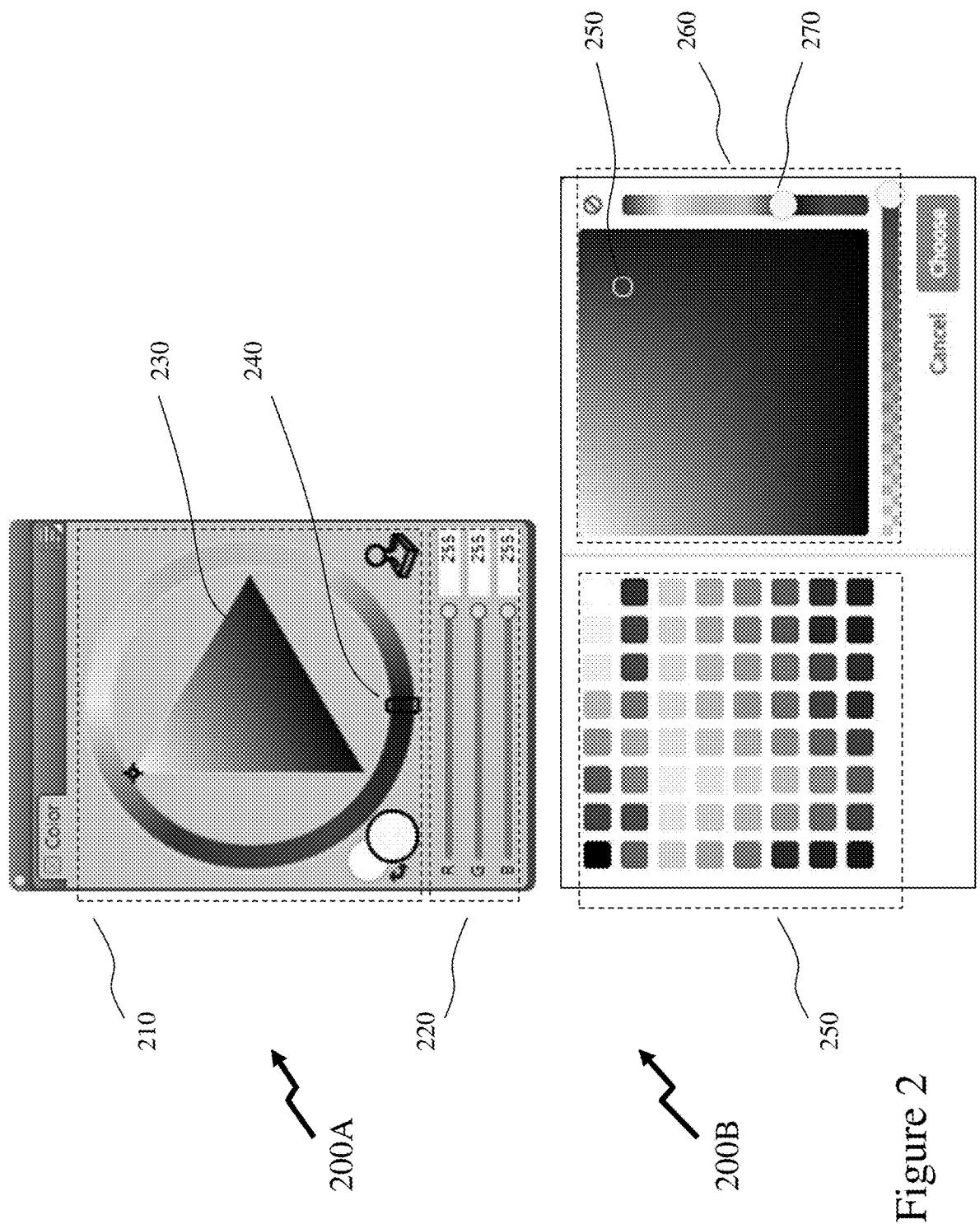
FIG. 2 depicts exemplary prior art graphical user interface (GUIs) for a user selecting an aspect of digital content to be added within a GESGEAP according to embodiments of the invention.

Now referring to FIG. 2 there are depict exemplary prior art first and second graphical user interface (GUIs) 200A and 200B for a user selecting an aspect of digital content to be added within a GESGEAP according to embodiments of the invention. First GUI 200A depicting what is known as a colour hue wheel comprising a colour wheel (Wheel) 210 and red/green/blue (RGB) values (RGB Values) 220. A user may select a colour using either Wheel 210 or RGB Values 220. Considering the Wheel 210 then the user through the first GUI 200A may rotate the wheel or move the Selector 240 to a different region such that the Hue region 230 adjusts to reflect the current portion of the spectrum being selected or viewed. The Hue region 230 providing a range of hues from the currently selected colour established by Selector 240 (at right tip of Hue region 230 to white (upper left tip) and black (bottom left tip). As the user manipulates the Selector 240 (or rotates the Hue region 230) then the RGB values within RGB Values 220 adjust. If the user then selects a hue within the Hue region 230 then the RGB Value 220 similarly adjusts.

In second GUI 200B the user is presented with a Hue region 260 comprising a Slider 270 and Pointer 250. Accordingly, the user can move the Hue region 260 to another region of the spectrum using Slider 270 and manipulate within the hues of the Hue region 260 by moving the Pointer 250. However, the user is also presented with Colour Region 250 which may present a range of predefined colours to the user. A portion of these predefined colours may, for example, be defaults of the GESGEAP, another portion may be recently selected colours established by the user within the GESGEAP, and a further portion may be default colours established by the user within the GESGEAP or imported by the GESGEAP from one or more configuration files associated with the user which are accessible to the GESGEAP as well as other GESGEAPs allowing the user's configurations/preferences etc. to be stored and retrieved.

However, in each instance of first GUI 200A and second GUI 200B and other such prior art GUIs for colour selection/setting the user selects a single colour. Accordingly, the user selects a single colour to employ, e.g. for a brush stroke, mark making tool, animation effect to be added etc. Accordingly, if a user wishes, for example, a graphical element being added to digital content to vary from yellow to red over the course of a second then the user with prior art GESGEAPs is required to define the graphical element in each frame within the final digital content published that will be rendered in the final graphical content and adjust the colour of this element within each frame to achieve the desired effect. This is a time consuming task requiring that the user not only perform the modification per frame but also understand how to adjust the colour per frame from their starting colour to the final colour. Accordingly, it would be beneficial to provide users with an alternative GUI interface allowing them to define a colour trajectory or colour path for a graphical element as a discrete element. This colour path is then applied by the GESGEAP upon generating the digital content such that the user can manipulate the position, duration, etc. of the graphical element as discrete element of the digital content and the GESGEAP will automatically perform the necessary determinations to generate the final frames of the published digital content containing the graphical element.

It would be evident that the colour path may be stored in conjunction with the graphical element allowing the user to define a graphical element which can be used in multiple items of digital content without having to regenerate it each time. Within a first item of content the start position, end position, path taken within the digital content, and duration may be set to a set of first values which are different to those within another item of digital content. The graphical element when added being handled, for example, upon a discrete layer of the GESGEAP so that the user can manage the graphical element discretely and enable/disable its rendering whilst they are working as well as within the final digital content. Accordingly, a user may generate a single animated segment for example and apply different graphical elements where each graphical element may be for a different language, different branding, etc. for example. Similarly, the graphical element may have different durations within different published digital content such as an animated GIF, 30 second video, full streamed content, etc. for example.

Figure 3:
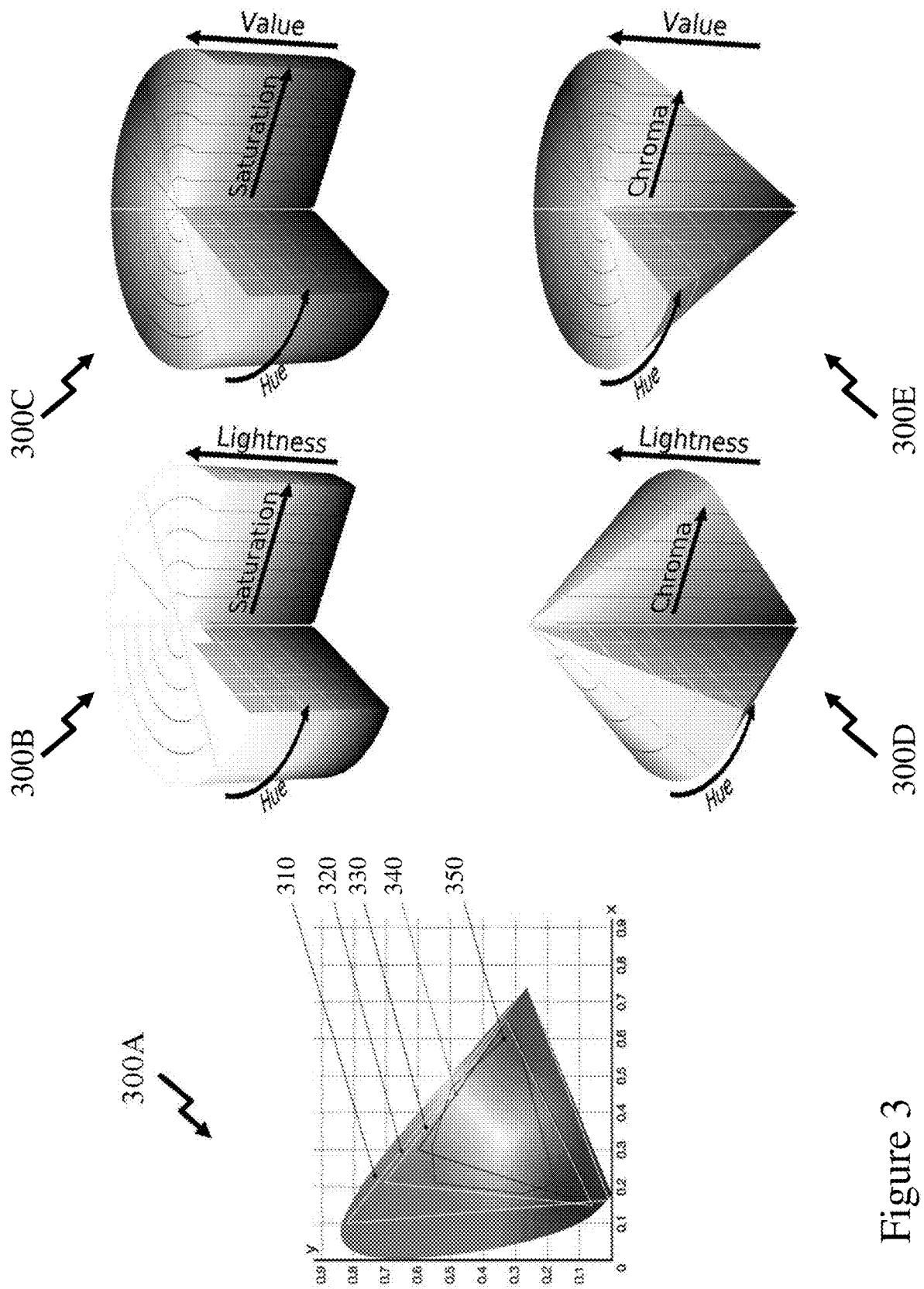
FIG. 3 depicts spaces and colour space representations for rendering to a user within a GESGEAP GUI according to embodiments of the invention.

Accordingly, referring to FIG. 3 there are depicted first to fifth colour spaces (COLSPCE) 300A to 300E respectively each providing a colour space representation for rendering to a user within a GESGEAP GUI according to embodiments of the invention. Considering, first COLSPCE 300A then there is depicted a CIE 1931 xy chromaticity diagram (CIExy) 310. These being all colours visible to a human. Accordingly, as described with respect to first COLSPCE 400A in FIG. 4 a user may define a path within the colour space representing a colour path for a graphical element.

Also rendered within CIExy 310 are first to fourth Boundaries 320 to 350 respectively, these comprising:

First Boundary 320 representing the colours defined by the ProPhoto RGB (also known as Reference Output Medium Metric (ROMM)) developed by Kodak™ which encompasses 90% of possible surface colors in the CIE L*a*b* (CIELAB) color space, and 100% of likely occurring real-world surface colors documented in 1980.

Second boundary 330 being those colours defined by the Adobe™ RGB (1998) which was designed by Adobe™ to encompass most of the colors achievable on CMYK color printers but using RGB primary colors on a device such as a computer display. The Adobe RGB (1998) color space encompasses roughly 50% of the visible colors specified by the CIELAB color space.

Third Boundary 340 being those defined by sRGB (standard RGB) which is a color space created by HP™ and Microsoft™ in 1996 to use on monitors, printers, and the Web which is standardized by the International Electrotechnical Commission (IEC) as IEC 61966-2-1:1999.

Fourth Boundary 350 being those defined by the US Specifications for Web Offset Publications (SWOP) CMYK which defines a subtractive (rather than additive) colour model for use in colour printing based upon the four ink plates (historically but now also colour inkjet printers etc.) used in colour printing, these being Cyan, Magenta, Yellow and Key (black).

Accordingly, the colour space accessible to a user may be defined by the selection of a colour space, e.g. ProPhotoRGB, Adobe™ RGB, SRGB, SWOP CMYK or others known to those of skill in the art, associated with the final digital content. For example, a user targeting a final printed document from the digital content may select SWOP CMYK or another colour space defined for printing whilst another targeting stream of content upon the Web (Internet) may employ sRGB. It would evident that within embodiments of the invention a colour path may be defined within the CIExy 310, for example, and automatically scaled to an appropriate boundary, e.g. first to fourth Boundary 320 to 350, based upon a definition of the final digital content. Accordingly, a user may generate a single item of digital content with a digital element exploiting a colour path according to an embodiment of the invention which is automatically scaled if they select a "print" output format rather than a "stream" or "web" output format, for example. The user may elect to use the automatically defined colour path resulting from this scaling to the defined boundary or that may adjust each individually once generated to modify each discretely. Optionally, a user may specify a different custom boundary rather than selecting one according to a standard.

Second to fifth COLSPCE 300B to 300E represent Hue, Saturation, Lightness (HSL) or Hue, Saturation, Value (HSV) representations of the RGB colour model which align more with the manner in which human vision perceives colour making attributes. HSL models the way different paints mix together to create colour in the real world whilst HSV models represent how colours appear under illumination (light). These being:

Second COLSPCE 300B depicts HSL as a cylindrical representation with hue being the angular dimension.
Third COLSPCE 300C depicts HSV as a cylindrical representation with hue being the angular dimension.
Fourth COLSPCE 300D depicts HSL where hue is plotted against chroma (range of RGB values) rather than saturation resulting in a biconic representation with hue being the angular dimension, chroma radial distance, and lightness vertical.
Fifth COLSPCE 300E depicts HSV where hue is plotted against chroma (range of RGB values) rather than saturation resulting in a conic representation with hue being the angular dimension, chroma radial distance, and value vertical.

It would be evident that other representations of colour space may be employed within embodiments of the invention without departing from the scope of the invention. Accordingly, referring to FIG. 4 and first to fourth COLSPCE 400A to 400D respectively there are depicted exemplary GUI elements for a user to establish a colour path for manipulating and/or modifying a digital element within a GESGEAP GUI according to embodiments of the invention. Accordingly, referring to first COLSPCE 400A the user is presented with a CIE x y colour space such as described above in respect of CIExy 310 in FIG. 3. Accordingly, the user has presented the CIE x y colour space without any modifications to reflect selection of as colour space such as described above in respect of FIG. 3. Within this the user can establish first to fourth colour paths (COLPATHs) 410A to 440A respectively wherein each represents a colour trajectory or path to be applied to a graphical element according to the timeline for the duration of the graphical element. Optionally, the user may, as will be discussed below, establish a colour casing by applying an casing to the COLPATH such that the "velocity" at which the colour transitions defined by the COLPATH are applied to the graphical element may be non-linear rather than linearly applied for the duration of the graphical element's visibility within the digital content. Optionally, within other embodiments of the invention a GUI and/or control settings of the GESGEAP may allow the user to define the path and apply it multiple times for the duration of the graphical element. For example, fourth COLPATH 440A by virtue of being a closed loop may be applied 2, 3, or more times without apparent discontinuity whilst second COLPATH 420A may be repeated but with discontinuity as the start/end colours are different.

As will become evident with respect to the description below the user can specify the COLPATH discretely or the COLPATH and its associated colour casing (COLEASE) through a variety of mechanisms within the GUI and/or GESGEAP. For example, the user may:

Take a defined function, e.g. closed loop and adjust its position and dimensions to generate, for example fourth COLPATH 440A. First and second COLPATHs 410A and 420A may be similarly defined by sinusoidal and straight line functions.
Establish the COLPATH through a user interface, e.g. third COLPATH 430A, wherein the user may draw the path or the GESGEAP may generate the COLPATH by tracking the user's action with a haptic interface or user interface. For example, the user may trace the COLPATH with a stylus onto a rendered colour space within a GUI which may be popped up larger than those depicted in FIG. 1D to allow enhanced resolution of placement. It would be evident that the COLEASE may be concurrently acquired based upon a gesture characteristic of the user's gesture with the user interface or haptic interface. For example, the user's speed of motion of drawing the path is applied directly as the colour easing or a pressure of the user upon a touch screen interface, angle of a stylus relative to display, etc. may all be employed to concurrently define the colour casing together with the colour path.

Exploit a predefined function that defines not only the geometry, e.g. a loop, straight line, Gaussian, etc. or a mathematical function allowing the user to define its location.

Exploit a predefined function that defines not only the geometry, e.g. a loop, straight line, Gaussian, etc. or a mathematical function, but also defines its location/parameters.

Second COLSPCE 400B depicts a similar scenario as first COLSPCE 400A but the user has defined the colour space as being Adobe™ RGB, see FIG. 3, wherein the colour space is limited to those defined by the selected colour space. As discussed above previously defined colour paths/colour casing may be automatically scaled to reflect selection of a colour space, thereby resulting in fifth to eighth COLPATHs 410B to 440B or the user may be prompted to adjust a previously selected path such as that depicted with ninth COLPATH 495 where it is evident prior to adjustment that a portion of the selected colour path lies outside the range of the currently defined colour space when such previously established colour paths are not automatically adjusted to a new colour space.

Third COLSPCE 400C depicts a HSV conical rendering of a colour space where the user has established a first 3D COLPATH 450. In third COLSPCE 400C the colour path is three dimensional rather than two dimensional with the CIExy colour spaces within first and second COLSPCE 400A and 400B, respectively. Accordingly, the user may be required to enter this in a more complex manner through a GUI or the user interface may support three dimensional tracking/input such that, for example, the tip of a stylus is tracked in three-dimensions (3D) to define the three-dimensional colour path. Optionally, where the GESGEAP supports augmented reality or virtual reality then the user may be presented with a virtual 3D rendering of the colour space thereby enhancing their ability to define and/or manipulate the colour path and/or colour casing. Such augmented reality and/or virtual reality interfaces may be employed with other 3D colour space renderings such as the cube colour space depicted in fourth COLSPCE 400D and wireline colour space rendering in fifth COLSPCE 400E. Accordingly, within fourth COLSPCE 400D the rendering of the colour path may vary width so that when rendered upon the 2D GUI of the GESGEAP the user has the perception of depth when employing non-augmented reality/non-virtual reality interfaces. This being simply depicted by first and third COLPATH sections 460A and 460C being of narrower width than second section 460B. It would be evident that within a GESGEAP according to embodiments of the invention that such a path width variation to represent depth may be continuous or employ a large number of segments rather than the limited depiction in FIG. 4I.

Second 3D COLPATH 470 in fifth COLSPCE 400E being rendered upon a 3D wireline 480. This may allow the user to define and visualize a colour path independent of a colour space so that their construction of a complex path may be established prior to mapping the path onto a portion of a colour space. Such a path may be stored as a defined function which is then mapped to a colour space, such as those depicted in FIGS. 3 and 4 by the user adding it to a colour space, e.g. by dragging or dropping, importing etc.

Figure 4:
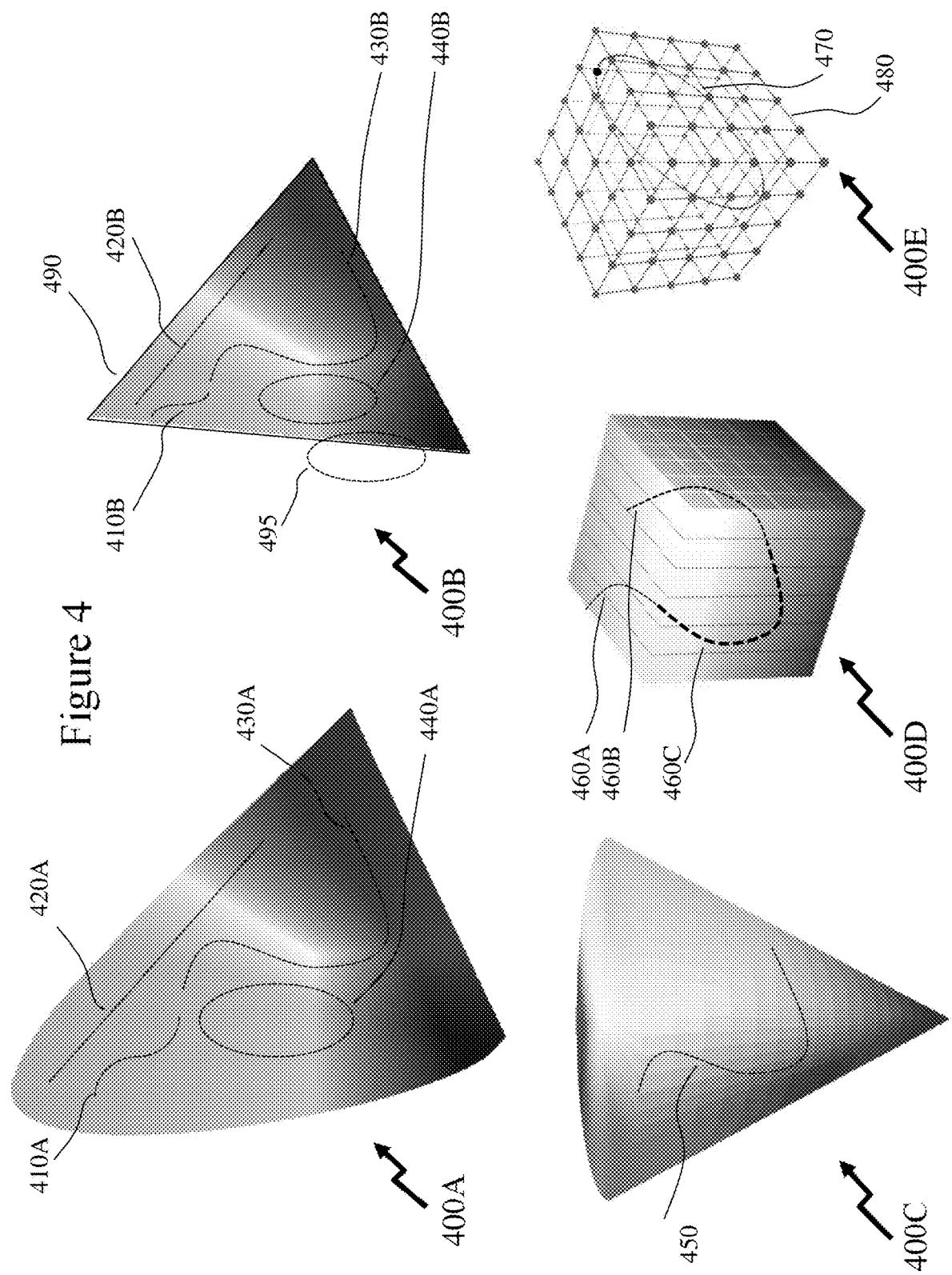
FIG. 4 depicts exemplary paths and path rendering styles for manipulating and/or modifying a digital element within a GESGEAP GUI according to embodiments of the invention.

Within FIGS. 3 and 4 the colour path has been described with respect to a user defining the colour path within a colour space. However, within embodiments of the invention a colour path may be defined, such as for example using fifth COLSPCE 400E wherein the actual mapping of the defined colour path, second 3D COLPAT 470, for example, is defined in dependence upon another parameter of the digital content and/or the digital element. For example, a digital element may have been defined with a loop of duration two seconds covering a predetermined portion of a colour space. The absolute position of the loop within the colour space may be defined in dependence upon, for example, a current elapsed time of the digital content the digital element is within and a property of the underlying digital content to which the digital element is an overlay, e.g. its brightness, magnitude of a colour component (e.g. red, green, or blue for example). Alternatively, the position of the loop upon the colour space may be defined, in the example of a CIExy colour space which requires only two parameters to define a centre of the loop (i.e. x and y) by the magnitude of two colour components (e.g. red and green), the inverse of a pair of colour components (e.g. green and blue), a magnitude of treble and bass frequencies within associated audio content. Accordingly, using a CIExy colour space the user may associate position of a defined colour path based upon two parameters of the digital content within which the digital element is placed. Alternatively, the colour applied to a digital element may be defined solely in dependence upon a pair of parameters such that the colour path is defined by these two parameters rather than combining a loop/path of defined structure and moving it within the colour space. It would be evident that with other colour spaces such as the 3D colour spaces in FIGS. 3 and 4 that the colour path may be defined solely by or a position of a colour path may be defined by, three parameters established in dependence upon the underlying digital content.

Within alternate embodiments of the invention the easing applied to a colour path may be established in dependence upon mapping one or more parameters of the digital content to the casing. For example, a colour path may be defined as a circular loop within a CIExy colour space wherein the absolute position, range etc. of the colour path are defined. However, the casing (equivalent to a velocity or speed of traversing the path) may be linked to a characteristic of the digital content such that this characteristic or characteristics varies then casing applied to the colour path changes. For example, the casing may be directly dependent or inversely dependent upon a tempo of an audio track forming part of the digital content, or a measure of overall brightness of the digital content, a colour of a region defined within the digital content, a brightness of a region defined within the digital content etc. In this manner variations to the underlying digital content result in changes to the colour path and/or colour casing. It would be evident that a user may define a function to establish the adjustment from a single parameter of the underlying digital content or can extend this to more complex functions employing two, three or more parameters of the underlying digital content to impact the colour path and/or casing applied to the digital element.

Within the description above and below specific exclusion of the concept of frames and/or keyframes as known to one of skill in the art with respect to digital video software applications and/or digital animation software applications has been made. This is because in their generalised form the embodiments of the invention may be defined such that the effects are established and then mapped to the digital content. Accordingly, a digital element and its colour path/casing etc. may be established within the digital content and then this is mapped to "frames" or "key frames" or other specific time based points within the final generated digital content. In this manner, the digital element may be mapped to different frame per second output formats, e.g. film at 24 frames per second (FPS), video transmission at 59.94 FPS, newer video standards at 120, 240 or 300 FPS, as well as newer film formats such as 48 FPS and 60 FPS. Such abstraction allowing a digital element to be defined and employed at different durations, e.g. 1 second, 5 seconds, 1.25 seconds, etc. However, it would be evident to one of skill in the art that the embodiments of the invention are compatible with such techniques as frames and/or keyframes.

Accordingly, a user may establish a preferred mode of operation, e.g. keyframe or relative (as the inventors refer to it since the placement of the digital element is not aligned to specific frames or keyframes). With keyframe based deployment of embodiments of the invention the duration of the digital element is aligned to the start and end keyframes whereas with relative the user can simply move/scale without consideration of frames and/or keyframes. As will become evident through descriptions of embodiments of the invention relative modes of operation provide increased flexibility and usability.

Figure 5:
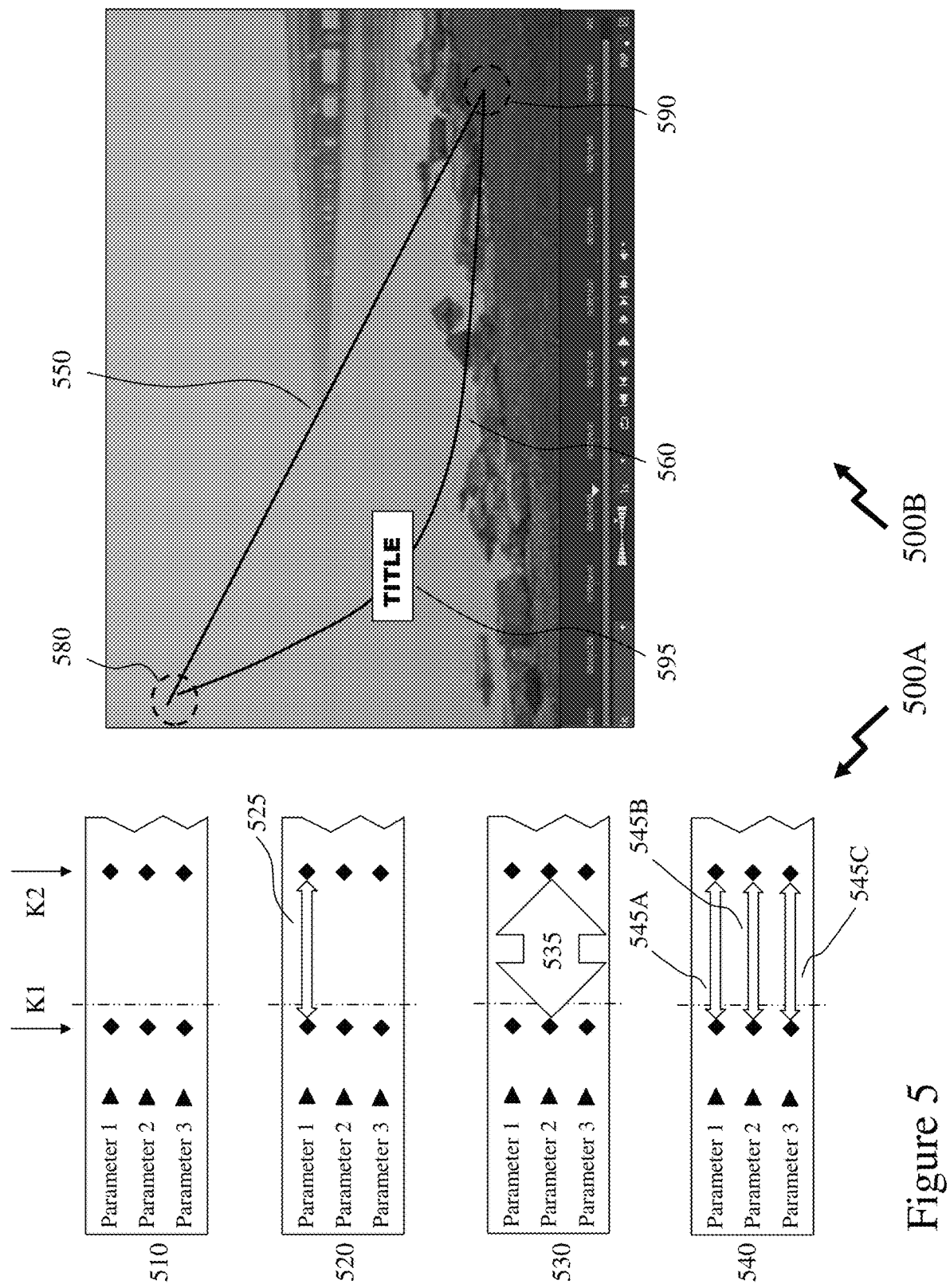
FIG. 5 depicts an exemplary path being established for manipulating and/or modifying a digital element within a GESGEAP GUI according to a methodology employing keyframes.

Referring to FIG. 5 depicts an exemplary path being established for manipulating and/or modifying a digital element within a GESGEAP GUI according to a methodology employing keyframes. Referring to first Timeline 510 in first Image 500A there is depicted a timeline representation of digital content wherein a first keyframe (K1) and a second keyframe (K2) are defined. Accordingly, referring to second Image 500A the user by moving to the first time point. T=T1, defines the position of the Element 595 at the first keyframe K1 as first position 580, defined as [X1,Y1,Z1] wherein X1, Y1 and Z1 are the horizontal position, vertical position, and depth of the Element 595 within the rendered digital content. The user now moves to a second time point. T=T2, and defines the second keyframe, K2, with coordinates [X2, Y2,Z2] to define the second position 590. Accordingly, the software executes and defines the first Path 550 for Element 595 which is a linear path. Accordingly, the physical position is linearly interpolated between K1 and K2 where the position [X3,Y3,Z3] at T=T3 is linearly interpolated as given by Equations (1) to (3) respectively.

$$X3=X1+(X2-X1)*(T3-T1)/(T2-T1) \quad (1)$$

$$Y3=Y1+(Y2-Y1)*(T3-T1)/(T2-T1) \quad (2)$$

$$Z3=Z1+(Z2-Z1)*(T3-T1)/(T2-T1) \quad (3)$$

However, as noted previously the colours of the element are defined at each keyframe using the tools such as defined in FIG. 2. Accordingly, within the prior art the shape of this path cannot be changed unless additional keyframes are created between K1 and K2, namely K3, . . . , KN wherein the GESGEAP still treats the motion between successive keyframes as being a linear interpolation. Accordingly, generated a path such as second Path 550 in second Image 500B requires multiple keyframes to establish a smooth curve which is really a piece-wise linear construct.

In contrast, the user within a GESGEAP according to an embodiment of the invention may define a physical path by defining the first and second positions 580 and 590 respectively, and then defining a function for the transition. Considering second Path 550 this may be an exponential decay function, according to a function given by Equation (4) where the user can specify the decay constant, λ, where the quantity N is position for example and t is the time elapsed between the times for the path established. Hence, the user can define a path and then apply it to a digital element within the digital content. The resulting path being defined therefore by Equation (5).

$$dN/dt=-\lambda N \quad (4)$$

$$N(t)=N0 \exp(-\lambda t) \quad (5)$$

Hence, as λ increases the exponential decay becomes sharper. The user can then define adjust the start time, end time with ease and the GESGEAP performs all of the necessary interpolations according to the function defined or path set by the user. Accordingly, continuing with the example in second Image 500B this exponential decay in position for the physical path can be set as parameter as depicted in second Timeline 520 where the exponential decay function 525 is applied to Parameter 1 (e.g. position). However, the user can now assign this function to other parameters such as depicted in third Timeline 530 where the exponential decay function 535 is applied to Parameters 1 to 3 (e.g. position, colour, brightness for example). Accordingly, the user as described above with respect to the colour path and easing may establish complex transitions for the digital element. Alternatively, as depicted in fourth Timeline 540 the user may establish different functions, first to third Functions 545A to 545C, for Parameter 1, Parameter 2, and Parameter 3. For example, Parameter 1 may be position with exponential decay, Parameter 2 may be colour with linear variation, and Parameter 3 may be brightness with sinusoidal increase. It would be evident that a wide range of mathematical functions may be employed for defining a path for each parameter of the digital element. Accordingly, within embodiments each parameter, such as Parameter 1, Parameter 2 and Parameter 3 can have a path associated with it, a parameter path. Such paths may for example, include but not be limited to, a positional path, a colour path, a size path, an aspect ratio path, a brightness path, and a rotation path.

Further, whilst within embodiment of the invention the paths are defined with respect to graphical elements it would be evident that the embodiments of the invention may be applied to other elements of electronic content associated with an item of digital content, e.g. an audio track may have a volume driven by a functionally defined path or a path defined by another characteristic of the digital content. For example, the sound level may vary according to overall image brightness, to overall colour tone etc.

Within the embodiments depicted in FIG. 5 the physical path is depicted such that [X2,Y2,Z2] is different than [X1,Y1,Z1]. However, it would be evident to one of the skill in the art that this does have to be true as a path for position or other parameters may, as described above with respect to colour path, be closed in that the path closes back on itself. This path may be defined by a regular polygon, e.g. triangle, square, rectangle, pentagon, circle, ellipse etc. but it may be an irregular polygon or complex shape that closes back to an original starting position. It would be evident that within other embodiments of the invention a path may be defined by a one dimensional (1D) function, a two dimensional (2D) function, a 3D function, or an N-dimensional function.

Referring to FIG. 5 and second Image 500B then the Element 595, i.e. the word "TITLE moves" along the second Path 560 which has been defined within embodiments of the invention by a path representing it position, i.e. a positional path or XYZ path. Absent any additional information nothing defines how it moves along such the second Path with time, e.g. from T=T1 to T=T2. An initial assumption is that it moves linearly along that path with time. If the length of the path is L, in pixels or screen percentage for example, then the position of Element 595 at a time T3, T1≤T3≤T2, would be a linear interpolation along that length L. However, nothing limits this to being the case. Accordingly, the casing as employed by the inventor relates to defining the evolution of the parameter over the duration of the transition/path associated with the digital element. This may be visualized as a speed at which the transition progresses. As noted above in respect of colour path and easing applied to the colour path (referred to as colour easing) this can be defined by a time associated with the duration of the digital element within the digital content or it may be defined as being dependent upon one or more other parameters associated with the digital element and/or the digital content with which the digital element is associated. Accordingly, casing or the case applied to a parameter is itself another path but one relating to a speed of transition, i.e. velocity of the parameter changing. Optionally, the casing may be applied directly or applied through the application of a function.

Figure 6:
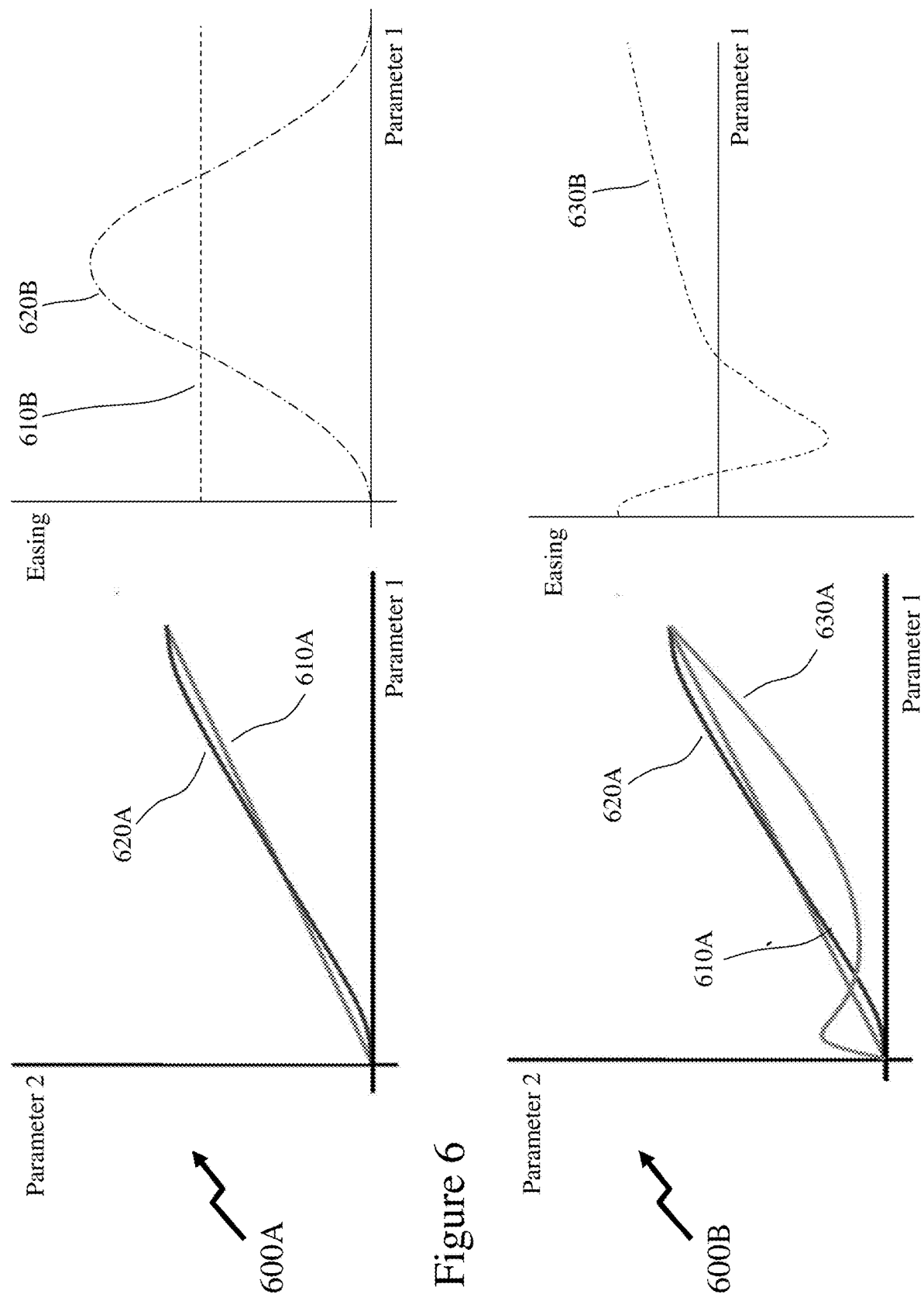
FIG. 6 depicts an application of easing to a path established for manipulating and/or modifying a digital element within a GESGEAP GUI according to embodiments of the invention.

Now returning to easing then this has been described above with respect to colour paths as being a speed of evolution of the parameter along the path. FIG. 6 depicts an application of casing to a path established for manipulating and/or modifying a digital element within a GESGEAP GUI according to embodiments of the invention to aid a reader's visualization of the concept. Accordingly, considering first Image 600A in FIG. 6 there is plotted a first Trace 610A representing a linear variation of Parameter 2 (e.g. position, colour etc.) versus Parameter 1 (e.g. time for position or position for colour etc.). As depicted in the right hand graph the first Easing 610B for this Trace 610A is constant. However, second Trace 620A represents a non-linear variation of Parameter 2 versus Parameter 1. Accordingly, the second Easing 620B depicted on the right hand graph shows that initially the easing is low before increasing to a higher value than the simple linear model and then slows again. Accordingly, second Trace 620A may be viewed as the product of first Trace 610A with second Easing 620B. Accordingly, the path of a digital element may be defined, e.g. positional path or colour path, but by varying the casing, e.g. positional easing or colour casing, the resulting rendered visualization varies.

Whilst first image 600A in the left hand graph depicts a simple cased path and a linear (which can be viewed as non-cased or as one having constant casing. If now the digital element duration, e.g. Parameter 1, is reduced/increased then the magnitudes of the first Easing 610B and second Easing 620B vary to ensure that the physical path is traversed within the modified timeframe.

However, it would be evident from second Image 600B that more complex behaviours may be established rather than simple formulaic behaviours. Accordingly, there are depicted in the left hand graph the linear path, first Trace 610A, the eased path of first Image 600A, second Trace 620A, and a more complex path, third Trace 630. Accordingly, the digital element position where Parameter 2 is position first moves along the path towards its final position, then backtracks along that path, and then moves forward to its final position. If this is then plotted as Easing 630B in right hand graph then it begins initially positive, before reducing to zero, going negative before reversing again and going positive. Accordingly, in these instances the casing may be viewed as a derivative representing a rate of change of Parameter 2 as a function of Parameter 1. Within other embodiments of the invention the path may be defined, and the casing represents the rate of change which is only positive rather than negative. Accordingly, a simple path with complex casing may provide a similar visualization as a more complex path definition with simple casing. Alternatively, both the path and easing may be complex functions.

Accordingly, it would be evident that the characteristics of a digital element may be defined by a path for a characteristic and an casing of the characteristic. For example, if the characteristic is a simple positional shift defined by a linear path, then the casing may oscillate positive and negative such that the resulting position of the digital element oscillates along the linear path. If the positional shift is now a more complex function, then the oscillating casing results in the digital element oscillating in a more complex manner. Within embodiments of the invention a path and easing may be defined with a ratio equal to one (i.e. the path and casing are each executed once for the duration that the digital element is present) or the ratio may be other than one such that for example the easing is performed N times for a single path over the duration that the digital element is present or that the easing is performed N times for M paths. This allows relatively simply path and casing definitions to be employed to generate more complex effects on the digital element. Further, as the casing (for example) may be a characteristic established in dependence upon another parameter of the digital content then very complex behaviours can be established.

In a similar manner if the path is brightness, then an casing oscillating positive and negative results in the digital element brightness varying. This can be sinusoidal of the casing is sinusoidal, blinking if the easing is a square wave, etc. Accordingly, repeating a single square wave casing N times results in N blinks. If the duration of an casing cycle is now established in dependence upon the underlying digital content, then the blinking will vary as the underlying digital image changes.

Generally speaking therefore a path defines a variation of a characteristic of a digital element in a given space, e.g. a colour path in colour space, a physical path on the canvas (virtual representation of physical space). In some instances to ease establishment of the path and/or easing where the rendering of a visualization of the "space" the user is working within is difficult then the space may be broken down into a series of more manageable elements. Alternatively, a user may define a virtual space, e.g. a 3D space with intensity as one axis, size of digital element as the second axis, and rotation of the digital element with respect to an axis perpendicular to the canvas as the third axis. The user may elect to render this as a spherical space, or alternatively, a conical space, biconic space, cubic space, a polyhedron, or a spheroid for example. Accordingly, motion of a user interface element allows the user to establish a path within this space which is then applied to the digital element. Within embodiments of the invention as the user makes the gesture or gestures to generate this path then the GESGEAP may be determining one or more characteristics of the user's gesture(s) as defined by the user to establish the ease or these may be derived automatically. Accordingly, if the user selects automatic then if they gesture rapidly this is automatically a higher easing than when they gesture slowly. However, the user may select pressure so that even though the entire gesture is relatively constant in motion made by the user the varying pressure they apply results in the easing being varied accordingly.

In some instances, a user may generate multiple paths and multiple casings which are applied to the digital element. Optionally, the user may elect to break down an N-dimensional space to a series of 2D spaces for generating the path and casing as they can conceptualize and visualize this easier. Optionally, they may break the N-dimensional space to N 1D spaces or a series of 3D spaces. As noted above a path may be a function of another path. Hence, for example, brightness may be a function of position whilst position is itself a function of an underlying acoustic element of the digital content. Accordingly, a common digital animation rendered with two different acoustic tracs would yield different animations.

Within the description above the inventor has stated that the concepts of path and casing may be employed in conjunction with keyframes, or they may be independent of them and viewed as replacement of keyframes. With keyframes, behaviors are described at the frame to frame level, with some "vectorization" done through simple linear interpolation, and limited casing (i.e. limited to rate of change of position). However, the concepts of paths and casing as established by the inventor may be viewed as a vectorization of all behaviors, and the behaviors are then applied to a discrete digital element or set of digital elements positioned within the digital content where the placement, duration etc. of the digital element is not defined through keyframes but may be independent of them or aligned with another aspect of the digital content. For example, a digital element may be linked to digital audio element such that movement of the digital audio element automatically moves the digital element or vice-versa.

As noted above without access to embodiments of the invention if a videographer wants to present an effect on screen, such as the movement of an object (e.g. title, mask, etc.) with accuracy and detail then the videographer has to "paint" this effect on a frame by frame basis. The limited exceptions are linear interpolations and pre-defined (or as known in the industry-pre-canned) casing or effects (e.g. make the letters of a title move in a circle for example). Whilst casing the workload on the videographer these pre-canned approaches limit the videographer to simple pre-pared effects and their parameterized variations. These pre-canned effects being generated originally by the very tedious the process the videographer seeks to avoid having to do themselves.

Accordingly, the embodiments of the invention allow the videographer to define an effect through one or more paths and one or more casings where these can be user specified or defined through mathematical functions and curves. In order to simplify the processing embodiments of the invention may approximate a curve with a polynomial representation, such as Bezier curves. Bezier curves are well known, very stable and reproduceable, and computationally efficient. However, full mathematical definitions may be employed where computational resources support them, for example. Accordingly, in scenarios such as mobile devices the user may be limited to approximations whilst a desktop implementation or remote session based implementation may support full mathematical functions. Accordingly, the path(s) and casing(s) can be defined independently of the digital content, frames etc. allowing them to be embedded and employed independently of framerates for example. A final rendered output may establish a framerate in some instances.

Figure 7:
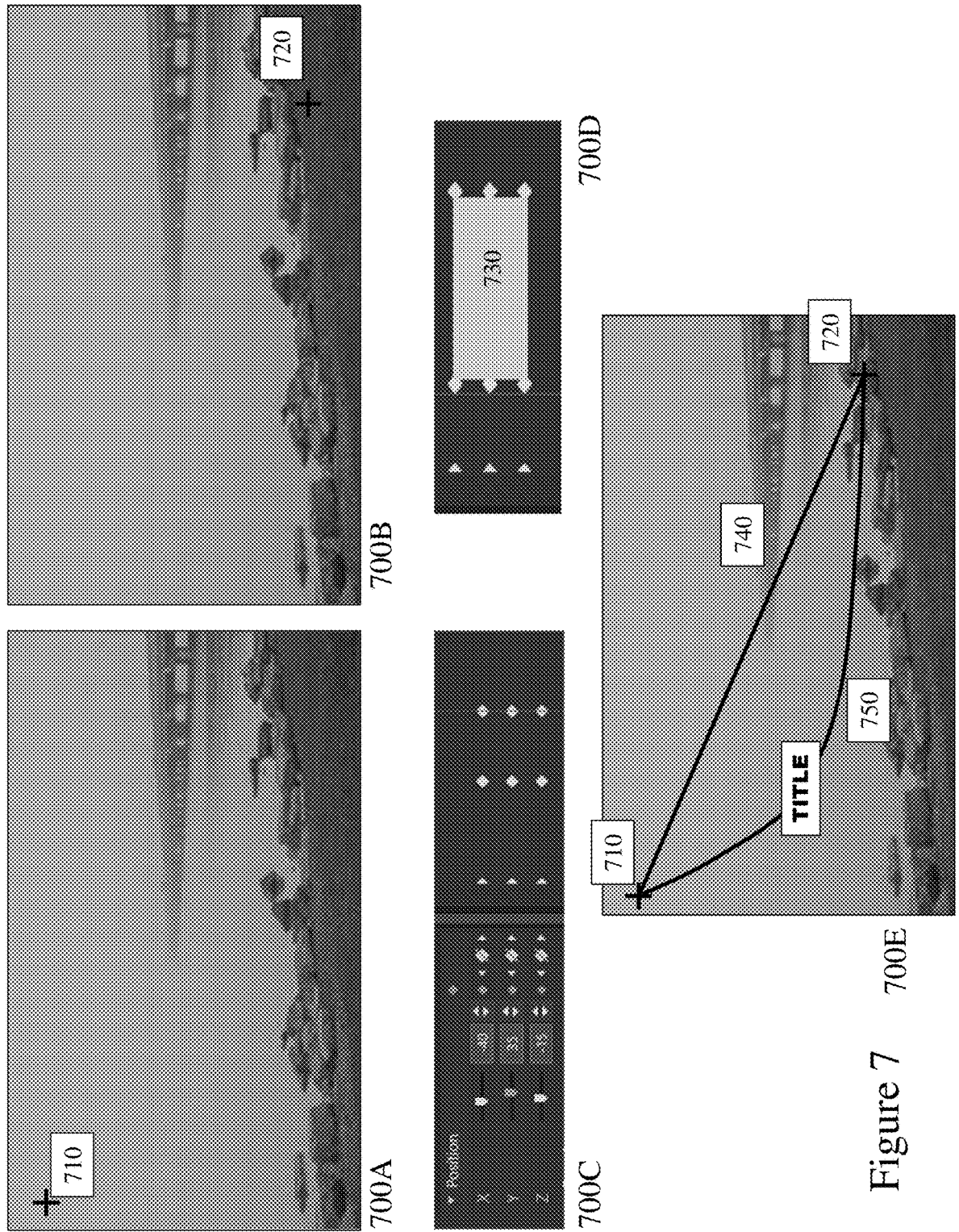
FIG. 7 depicts an exemplary sequence for a user adding a digital path and easing for manipulating and/or modifying a digital element within a GESGEAP GUI according to embodiments of the invention.

Referring to FIG. 7 there is depicted an exemplary sequence for a user adding a digital path and casing for manipulating and/or modifying a digital element within a GESGEAP GUI according to embodiments of the invention. For ease of visualization of the process with a Figure the exemplary sequence is depicted with respect to the spatial movement of a digital element. Accordingly, referring to FIG. 7 there are depicted first to fifth Images 700A to 700E, respectively. These comprising:

First Image 700A where the user has moved to a first point within the item of digital content and established a Start Position 710 for the digital element to be manipulated and/or modified.

Second Image 700B where the user has moved to a second point within the item of digital content and established an End Position 720 for the digital element being manipulated and/or modified.

Third Image 700C wherein a GUI element of the GESGEAP now displays information such as the X, Y and Z coordinates of the End Position 720 where X is associated with the point within the digital content at which the End Position 720 is defined (e.g. a time stamp for example) and Y and Z are the spatial coordinates on the canvas. Optionally, X,Y,Z within another embodiment of the invention may be 3D spatial coordinates and a fourth coordinate T may be added to define the "time" aspect within the digital content. The vertical redline denotes that the timebase is at the point where the End Position 720 is defined which is denoted relative to each coordinate as a "diamond." The other set of diamonds to the left of these with the redline being those associated with the point at which the Start Position 710 was defined. Within this exemplary sequence the images presented may be familiar to a user as reminiscent of keyframe definition within a GESGEAP but the timebase is that of the digital content and/or GESGEAP rather than keyframes. Within another embodiment of the invention the path may be defined and depicted within the digital content as the user moves through it where they define the start position (or this may be automatically established in other embodiments) and adjusts the timeline (duration) etc.

Fourth Image 700D wherein the user indicates that they wish to define a 3D path for the digital content being added, as depicted this is by marking the space between the start indicators and end indicators with a Block 730. Optionally, the Block 730 may be associated with a single axis or a pair of axes.

Fifth Image 700E the GESGEAP renders to the user an initial Linear Path 740 between the Start Position 710 and End Position 720. The user may now define the path through user input, e.g. through a user interface such as a stylus upon a tablet or touch sensitive display for example or through definition of a function. For example, the user selects a function which generates Path 750. The user can adjust the Path 750 by modifying points within their entered curve or through varying parameters of the selected function or even the function itself. At this point the user makes a GUI entry denoting that they have finished modifying the path. At the same time as entering the path or in a discrete separate step the user can define the easing for this path.

Once, the user denotes that they have finished generating the path and/or casing the GESGEAP stores the path and/or casing with the digital element so that these aspects are applied when the GESGEAP renders the electronic content containing the digital element to the user. Optionally, the GESGEAP may allow the user to save the digital element with its path and/or casing as an item for subsequent retrieval and insertion into another item of digital content. When storing the digital element the GESGEAP may store the full mathematical functions, if employed, whilst it may employ simple formulaic descriptions of the path and/or casing when rendering during generation rather than in final rendering for export/saving/printing etc.

Within embodiments of the invention the GESGEAP may provide defaults to a user such that, for example, casing applied to a physical path such as Path 750 in fifth Image 700E in FIG. 7 may be constant case, constant case on one axis, constant case on another axis, sinusoidal ease so that it slows down at the beginning and end with faster motion in the middle etc. Within GESGEAPs according to embodiments of the invention users today can define digital elements and digital content on multiple layers which they can manipulate/manage discretely prior to defining which layers are combined/merged to generate the final output. However, embodiments of the invention may be employed within other GESGEAPs such as Microsoft™ PowerPoint™ for example which does not provide these but allows for direct discrete management of elements. In this example the final output may be a series of slides/images rather than a video segment for example.

Figure 8:
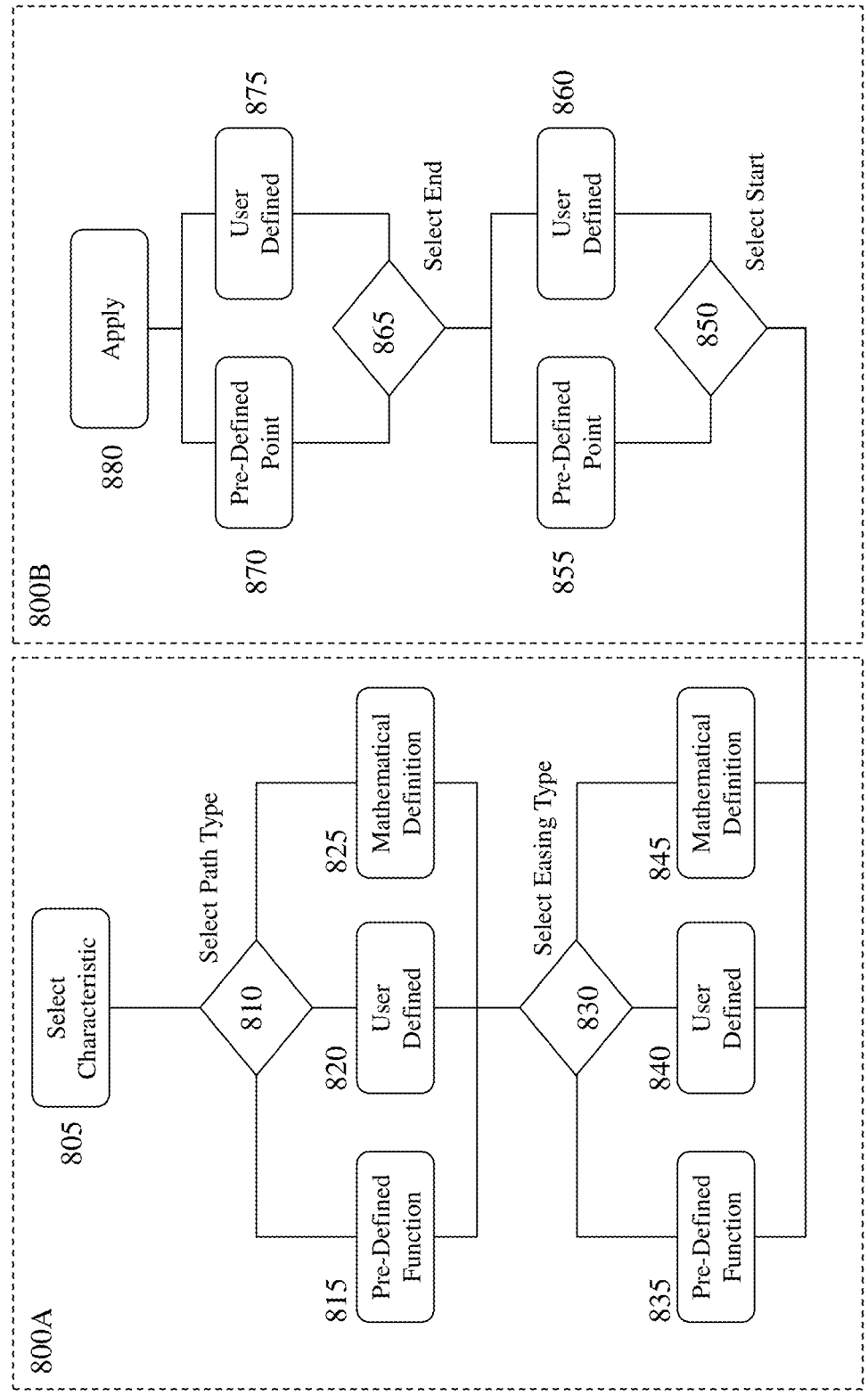
FIG. 8 depicts an exemplary process flow for establishing a digital path and easing for manipulating and/or modifying a digital element within a GESGEAP GUI according to embodiments of the invention.

Now referring to FIG. 8 there is depicted an exemplary process Flow 800 for establishing a digital path and easing for manipulating and/or modifying a digital element within a GESGEAP GUI according to embodiments of the invention. As depicted Flow 800 comprises a first Sub-Flow 800A and a second Sub-Flow 800B. First Sub-Flow 800A comprises first to ninth steps 805 to 845 respectively, these comprising:

First step 805 wherein the user selects a characteristic of a digital element, e.g. an item or items on one or more layers of a GESGEAP according to an embodiment of the invention before proceeding to second step 810. Within the following description the characteristic is presumed to be colour, but it would be evident that any other definable/variable characteristic of a digital element may be selected by a user. Optionally, the user may select to set multiple characteristics concurrently.

Second step 810 where the user selects a path definition entry type, for example, pre-defined function, user defined or mathematical definition wherein upon selection of the appropriate option the process proceeds to one of third, fourth and fifth steps 815 to 825, respectively.

Third step 815 wherein the user has selected a predefined function for the path type wherein the user may select, for example, from a menu of functions and set one or more parameters associated with the function selected. For example, the function may be a circular path wherein the user is rendered a colour space representation, e.g. CIE x y such as depicted in first Image 400A in FIG. 4, together with the circular path such that they may, for example, set the central point of the colour path and its radius. If the user prefers a different colour space representation, then they may define this, and the GUI will shift allowing them position/dimension the function wherein once completed the process proceeds to sixth step 830.

Fourth step 820 wherein the user has selected a user defined path and accordingly the user is presented within a GUI with a colour space representation allowing them to define the path to be used wherein once completed the process proceeds to sixth step 830.

Fifth step 825 wherein the user has selected a mathematical function and accordingly the user is presented with a GUI comprising a colour space representation together with menu for the mathematical function, settings for the selected mathematical function and upon their entering of these parameters for a selected function is presented with a rendering of the colour path. Again, once completed the process proceeds to sixth step 830.

Sixth step 830 wherein the selects an easing definition entry type, for example, pre-defined function, user defined or mathematical definition wherein upon selection of the appropriate option the process proceeds to one of seventh, eighth and ninth steps 835 to 845, respectively.

Seventh step 835 wherein the user has selected a predefined function for the easing type wherein the user may select, for example, from a menu of functions and set one or more parameters associated with the function selected. For example, the easing function may be Gaussian such that the motion starts slowly, gets faster to the mid-point, and then slows down to the end. The user may be able to move the "peak" thereby making the Gaussian asymmetric so that the motions before/after the peak are different durations rather than equal for example. Once completed the process proceeds to second Sub-Flow 800B.

Eighth step 840 wherein the user has selected a user defined path and accordingly the user is presented within a GUI allowing them to define the easing to be used wherein once completed the process proceeds to sixth step 830. For example, this may be by them defining a profile through a user interface. Once completed the process proceeds to second Sub-Flow 800B.

Ninth step 845 wherein the user has selected a mathematical function and accordingly the user is presented with a GUI comprising, for example, a menu for the mathematical function, settings for the selected mathematical function and upon their entering of these parameters for a selected function is presented with a rendering of the easing. Again, once completed the process proceeds to second Sub-Flow 800B.

It would be evident that first Sub-Flow 800A may be repeated for multiple characteristics of the digital element where the user wishes to set these individually rather than concurrently with the same path type/casing. Accordingly, additional steps may be provided to allow for multiple characteristics to be set before the process proceeds to second Sub-Flow 800B. Second Sub-Flow 800B comprises tenth to sixteenth steps 850 to 880 respectively, these comprising:

Tenth step 850 wherein the user defines how they will select a start point for the digital element within the digital content and/or when to start applying the path/casing to the characteristic of the digital element. Within this description it is implied that the start/stop of the digital element within the digital content are also the start and stop of the path/casing. However, it would be evident that this may not be the case wherein the user can define the path/case as applying over a portion of the duration of the digital element rather than having to create a path/case that has defined constant start/stop portion before/after the path/case are applied. Within the example presented in second Sub-Flow 800B the user can define a pre-defined point or a user defined point wherein the second Sub-Flow 800B proceeds to eleventh step 855 or twelfth step 860, respectively.

Eleventh step 855 wherein the user has selected a pre-defined point such that, for example, the user defines it as the start of the digital content, to be aligned with another item of digital content, etc. so that the GESGEAP establishes the start point based upon the user's selection of pre-defined point without them having to actually specify that point in time themselves. The second Sub-Flow 800B then proceeds to thirteenth step 865.

Twelfth step 860 wherein the user defines the start point themselves without reference to other defined points within the digital content. The second Sub-Flow 800B then proceeds to thirteenth step 865.

Thirteenth step 865 wherein the user defines how they will select a start point for the digital element within the digital content and/or when to start applying the path/casing to the characteristic of the digital element. Within the example presented in second Sub-Flow 800B the user can define a pre-defined point or a user defined point wherein the second Sub-Flow 800B proceeds to fourteen 870 or fifteenth step 875, respectively.

Fourteenth step 870 wherein the user has selected a pre-defined point such that, for example, the user defines it as the end of the digital content, to be aligned with an end of another item of digital content, etc. so that the GESGEAP establishes the end point based upon the user's selection of pre-defined point without them having to actually specify that point in time themselves. The second Sub-Flow 800B then proceeds to sixteenth step 880.

Fifteenth step 875 wherein the user defines the end point themselves without reference to other defined points within the digital content. The second Sub-Flow 800B then proceeds to sixteenth step 880.

Sixteenth step 880 wherein the GESGEAP stores the start point, end point, data relating to the digital element (e.g. a resource locator pointing to it rather than embedding it into the digital content), and the data for the path/case to be applied to the digital element. It also applies them to any current digital content loaded. Optionally, this may be encapsulated as a pre-defined "template" allowing the user to retrieve and insert the template into other digital content without having to regenerate the path/case etc.

Optionally, first and second Sub-Flows 800A and 800B may be presented to the user in reverse such that the user defines the start/end etc. within the digital content rather than the path type/casing of a characteristic or characteristics. Alternatively, these may be interleaved in different orders according to a preference of the user or default of the system such that for example the user defines the start, defines the path, defines the end, and then defines the casing. Within other embodiments of the invention the user may define that the path is fixed in respect of a characteristic of the digital content, e.g. time such that the user only needs to define when the digital element is to initially appear or end and the GESGEAP defines the end/start accordingly. Otherwise the GESGEAP scales the path to meet the defined start/end points.

Figure 9:
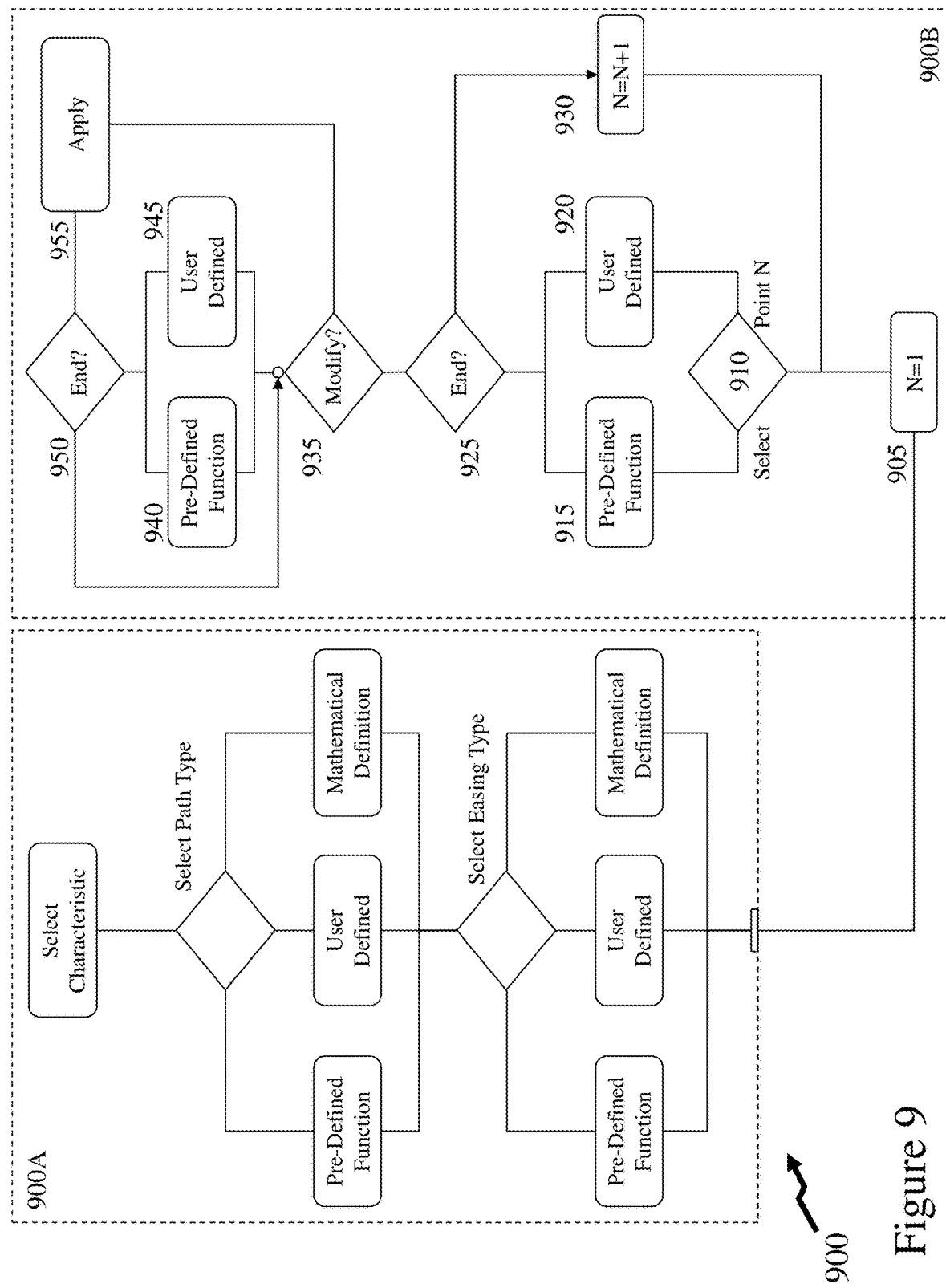
FIG. 9 depicts an exemplary process flow for establishing a digital path and easing for manipulating and/or modifying a digital element within a GESGEAP GUI according to embodiments of the invention.

Referring to FIG. 9 there is depicted an exemplary process Flow 900 for establishing a digital path and casing for manipulating and/or modifying a digital element within a GESGEAP GUI according to embodiments of the invention. As depicted Flow 900 comprises a first Sub-Flow 900A and second Sub-Flow 900B. First Sub-Flow 900A comprises the same steps as first Sub-Flow 800A in FIG. 8 such that the user defines a path to be applied to a characteristic of a digital element and then an easing to be applied to the path.

Second Sub-Flow 900B as depicted comprises first to eleventh steps 905 to 955, respectively. These steps comprising:

First step 905 wherein after execution of first Sub-Flow 900A a counter is initialized, N=1.

Second step 910 wherein the user defines whether they will select a point within the digital content to anchor the digital element to, e.g. a start point or an end point, by either user input or a pre-defined function of the GESGEAP wherein the process accordingly proceeds to third or fourth steps 915 and 920.

Third step 915 wherein the user has selected a pre-defined point such that, for example, the user defines it as the start of the digital content, to be aligned with another item of digital content, etc. so that the GESGEAP establishes the start point based upon the user's selection of pre-defined point without them having to actually specify that point in time themselves. The second Sub-Flow 900B then proceeds to fifth step 925.

Fourth step 920 wherein the user defines the point themselves without reference to other defined points within the digital content. The second Sub-Flow 900B then proceeds to fifth step 925.

Fifth step 925 wherein a determination is made as to whether the user has finished entering points with respect to the digital element wherein upon a positive determination the second Sub-Flow 900B proceeds to seventh step 935 otherwise it proceeds to sixth step 930.

Sixth step 930 wherein the counter is incremented and the second Sub-Flow 900B loops back to second step 910.

Seventh step 935 wherein the user determines whether to modify any of the points entered through first to sixth steps 905 to 930, respectively. Upon a negative determination the process proceeds to eleventh step 955 wherein the GESGEAP applies the path, easing and placement of the digital element otherwise the process seeks user input whether they wish to define a modification to a point by user input or a pre-defined function of the GESGEAP wherein the process accordingly proceeds to eighth or ninth steps 940 and 945.

Eighth step 940 wherein the user has selected to modify the previously established point with a pre-defined function such that, for example, the user defines it as the start of the digital content, to be aligned with another item of digital content, with another digital element, with a specific combination of characteristics of the digital content etc. so that the GESGEAP establishes the modified point based upon the user's selection without them having to actually specify that point in time themselves. The second Sub-Flow 900B then proceeds to tenth step 950.

Ninth step 945 wherein the user defines the modification location themselves without reference to other defined points within the digital content. The second Sub-Flow 900B then proceeds to tenth step 925.

Tenth step 950 wherein a determination is made as to whether the user has finished modifying points with respect to the digital element wherein upon a positive determination the second Sub-Flow 900B proceeds to eleventh step 955 otherwise it proceeds back to seventh step 935.

Eleventh step 955 wherein the GESGEAP applies the path, casing and placement of the digital element.

Accordingly, Flow 900 may be employed to apply a digital element in multiple locations within an item of digital content either within a small period of the digital content or distributed over the digital content. For example, a digital element may represent a flashing element which is applied at multiple spatial and temporal locations within the digital content so that the user can manipulate the digital elements once they have been applied. For example, the digital element may be initially applied as a "particle" of a particle brush such that the GESGEAP initially establishes the locations of the digital element from a brush stroke of the user where the "flashing" is defined through the path/casing established in the first Sub-Flow 900A wherein the user can then modify discretely each of the "particles" in spatial and/or temporal aspects.

Optionally, first and second Sub-Flows 900A and 900B may be presented to the user in reverse such that the user defines the start/end etc. within the digital content rather than the path type/casing of a characteristic or characteristics. Alternatively, these may be interleaved in different orders according to a preference of the user or default of the system such that for example the user defines the start, defines the path, defines the end, and then defines the casing. Within other embodiments of the invention the user may define that the path is fixed in respect of a characteristic of the digital content, e.g. time such that the user only needs to define when the digital element is to initially appear or end and the GESGEAP defines the end/start accordingly. Otherwise the GESGEAP scales the path to meet the defined start/end points.

Figure 10:
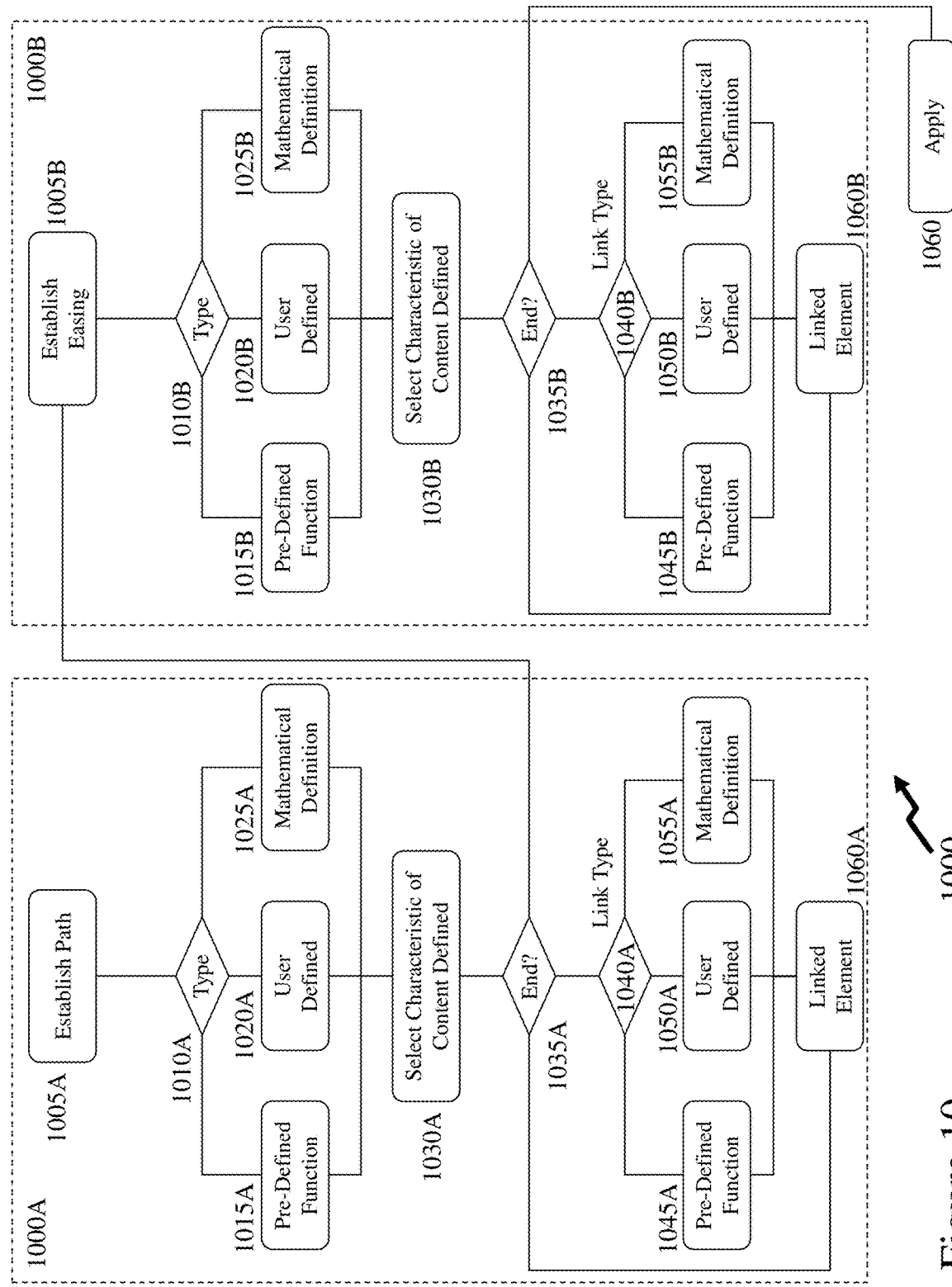
FIG. 10 depicts an exemplary process flow for establishing a digital path and easing for manipulating and/or modifying a digital element within a GESGEAP GUI according to embodiments of the invention.

Now referring to FIG. 10 there is depicted an exemplary process Flow 1000 for establishing a digital path and easing for manipulating and/or modifying a digital element within a GESGEAP GUI according to embodiments of the invention. As depicted Flow 1000 comprises first Sub-Flow 1000A and second Sub-Flow 1000B, respectively. First Sub-Flow 1000A comprising first to twelfth steps 1005A to 1060A, these comprising:

- First step 1005A wherein the user defines that they wish to establish a path wherein the first Sub-Flow 1000A proceeds to second step 1010A.
- Second step 1010A wherein the user determines the path definition entry type, for example, pre-defined function, user defined or mathematical definition wherein upon selection of the appropriate option the process proceeds to one of third to fifth steps 1015A to 1025A, respectively.
- Third to fifth steps 1015A to 1025A relating to the pre-defined function, user defined or mathematical function definitions of the path. These being functionally similar to the processes described above in respect of steps 815 to 825 in first Sub-Flow 800A of FIG. 8 for example. From each of these steps the first Sub-Flow 1000A proceeds to sixth step 1030A.
- Sixth step 1030A wherein the user defines the characteristic to which the path should be applied.
- Seventh step 1035A wherein a determination is made as to whether the user wishes to link the path to a characteristic of the digital element, digital content, or another set of data, input etc. If the determination is negative the first Sub-Flow 1000A terminates and the Flow 1000 proceeds to thirteenth step 1005B in second Sub-Flow 1000B otherwise it proceeds to eighth step 1040A.
- Eighth step 1040A wherein the user determines what link type they wish to establish as depicted this again comprises pre-defined function, user defined or mathematical definition wherein upon selection of the appropriate option the process proceeds to one of ninth to eleventh steps 1045A to 1055A, respectively.
- Ninth to eleventh steps 1045A to 1055A relating to the pre-defined function, user defined or mathematical function definitions of the path. These being functionally similar to the processes described above in respect of steps 815 to 825 in first Sub-Flow 800A of FIG. 8 for example. From each of these steps the first Sub-Flow 1000A proceeds to twelfth step 1060A.
- Twelfth step 1060A wherein the user determines what they link is linked to. For example, this may be another characteristic of the digital element, a characteristic of another digital element forming part of the digital content the digital element is associated with, an external parameter, a user input, a viewer etc.

Accordingly, as depicted Flow 1000 progresses from first Sub-Flow 1000A to second Sub-Flow 1000B upon the user determining that they have completed adding data relating to specification of a path. Second Sub-Flow 1000B relating to the easing and essentially follows the same flow. Second Sub-Flow 1000B comprising thirteenth to twenty-fourth steps 1005B to 1060B, these comprising:

- Thirteenth step 1005B wherein the user defines that they wish to establish an easing for a path wherein the second Sub-Flow 1000B proceeds to fourteenth step 1010B.
- Fourteenth step 1010B wherein the user determines the path definition entry type, for example, pre-defined function, user defined or mathematical definition wherein upon selection of the appropriate option the process proceeds to one of fifteenth to seventeenth steps 1015B to 1025B, respectively.
- Fifteenth to seventeenth steps 1015B to 1025B relating to the pre-defined function, user defined or mathematical function definitions of the path. These being functionally similar to the processes described above in respect of steps 815 to 825 in first Sub-Flow 800A of FIG. 8 for example. From each of these steps the second Sub-Flow 1000B proceeds to eighteenth step 1030B.
- Eighteenth step 1030B wherein the user defines the characteristic to which the path should be applied.
- Nineteenth step 1035B wherein a determination is made as to whether the user wishes to link the path to a characteristic of the digital element, digital content, or another set of data, input etc. If the determination is negative the second Sub-Flow 1000B terminates and the Flow 1000 proceeds to final step 1060 to apply or store the path and easing with respect to the digital element and/or digital content or within a template file otherwise it proceeds to twentieth step 1040B.
- Twentieth step 1040B wherein the user determines what link type they wish to establish as depicted this again comprises pre-defined function, user defined or mathematical definition wherein upon selection of the appropriate option the process proceeds to one of twenty first to twenty third steps 1045B to 1055B, respectively.
- Twenty first to twenty third steps 1045B to 1055B relating to the pre-defined function, user defined or mathematical function definitions of the path. These being functionally similar to the processes described above in respect of steps 815 to 825 in first Sub-Flow 800A of FIG. 8 for example. From each of these steps the second Sub-Flow 1000B proceeds to twenty fourth 1060B.
- Twenty fourth step 1060B wherein the user determines what they link is linked to. For example, this may be another characteristic of the digital element, a characteristic of another digital element forming part of the digital content the digital element is associated with, an external parameter, a user input, a viewer etc.

Optionally, twelfth and twenty-fourth steps 1060A and 1060B may be prior to the user selection of the link types in eighth and twentieth steps 1040A and 1040B respectively or be part of it.

Optionally, Flow 1000 provides the user with the option of repeating the Flow 1000 for another characteristic. Accordingly, the user can set the path/easing for multiple characteristics of a digital element or set of digital elements, where the characteristics are selected from, but not limited to, 1D physical position, 2D physical position, 3D physical colour, intensity, size, 2D aspect ratio, 3D aspect ratio, 1D rotation, 2D rotation, 3D rotation, brightness, Optionally, the path and easing are intrinsically linked such that when the characteristic is associated with the path the easing is automatically associated rather than the user being able to independently establish these at different points in the creation process.

Optionally, within other embodiments of Flow 1000 the definition of the characteristic to which a path/easy apply may be defined initially at the start of the process Flow 1000 so that the path and easing are established for that characteristic and the user is then presented with the option of repeating the Flow 1000 for another characteristic.

Exemplary process Flow 1000 represents an example where the path(s)/casing(s) for the characteristics of a digital element are generated within a GUI of GESGEAP without any reference to an item of digital content to which the digital element is applied. Accordingly, the exemplary Flow 1000 relates to creation of an "effect"/transition/etc. which is then added to an item of electronic content.

Within other embodiments of the invention the path(s)/casing(s) are generated for a default digital element (e.g. a sphere, dot, alphanumeric character, etc.) wherein once the user completes the process the path(s)/easing(s) are stored without any reference to a digital element. Accordingly, the path(s)/casing(s) may be subsequently associated with an item of digital content which is then manipulated by the GESGEAP according to the path(s)/casing(s). In this manner a user can define an "effect" which is then applied to elements of digital content. In this manner, a user may define an effect which is then applied to digital content which may be alphanumeric text, text, an image, a set of images etc.

Within embodiments of the invention a path and/or casing may be associated with user and/or viewer input. This may be, for example, through a user interface of an electronic device the user is using and/or a user interface of another electronic device the viewer is using. Alternatively, the user input and/or viewer input may be automatically acquired through an electronic device associated with another electronic device upon which the digital content comprising the digital element is rendered upon. For example, this electronic device may be a user's PED such as a smartphone or activity tracker wherein a characteristic of the user is acquired and employed. For example, a digital artist may make the rate of flashing of a digital element proportional to the blood pressure of the viewer, a colour of a digital element linked to the viewer's heart rate, speed of walking, etc. Accordingly, digital content when rendered may be adjusted in aspects such as path and/or casing in dependence upon viewer characteristics as well as other data externally acquired.

Within the steps of defining a path or casing through a mathematical function or a pre-defined function the user may be provided with the option of linking the function to one or more external elements which are dynamically acquired when the digital content is rendered. For example, these one or more external elements may be stored within a cloud database which is periodically updated, derived from data stored within a periodically updated cloud database, extracted from cloud stored content, extracted from a uniform resource locator (URL) of an item of web content (e.g. web site, web page etc.) so that the path and/or casing are dynamically defined rather than statically defined. This being independent of or in conjunction with dynamic data relating to the viewer as described above.

For example, a colour path of a digital element may be a small circle wherein the centre of the circle is defined by a combination of two parameters, if using for example CIE xy colour space, such as one factor scaling the current ambient temperature and another factor scaling a current value of a currency (e.g. which is defined based upon a profile of the view or current location of the viewer). If the colour path is defined within a 3D colour space then a colour path may, for example, be centered upon or start at, a point defined in dependence upon three factors, e.g. current ambient temperature, viewer heartrate and speed of motion of the viewer. Within another embodiment of the invention a characteristic such as duration of a path may be defined as determined in dependence upon externally acquired data such as user's speed of motion, ambient temperature, viewer's heartrate, stock market value etc.

Where the path and/or easing are established in dependence upon dynamic real time data or periodically updated data then it would be evident that this rendering may require the viewer to employ a thin client, i.e. a thin version of the graphics editor or limited function version of the graphics editor, rather than a convention media player so that the thin client can generate the modified/manipulated digital element and render it with the digital content.

Further, the digital element may be dynamically defined or defined upon temporal, spatial, geographical, jurisdictional aspects such that, for example, the title of an item of multimedia content follows the same path/casing in two locations but is different (e.g. in English in one location and Spanish in another) or a vehicle may be changed (e.g. from a Nissan in Japan to a Ford in the United States. Accordingly, branding of audiovisual content may extend to dynamically assigning the digital element(s). Optionally, the digital content may be established in dependence upon a preference of the viewer. For example, a user viewing a science fiction film may state a preference for Federation starships relative to Romulan or Vulcan for example so that when a digital element defined as a starship is rendered the user preferences result in an appropriate digital element being retrieved. This may apply to other aspects of digital elements such as gender, body type, height, font, language, etc. Alternatively, the digital element may be defined by a broadcaster and/or distributor of the digital content.

Within embodiments of the invention described and depicted the underlying technology is presented with respect to simple paths. However, it would be evident that in the definition of a path and/or casing, either individually or as a combination, that complex paths may be defined through user inputs such as via gestures, complex mathematical functions, externally derived data etc.

With respect to defining a path and/or casing one of more gesture characteristics or expressions may be employed. Such gesture characteristics or expressions may include, but not be limited, to extend of motion, velocity, direction, pressure, wheel, tilt, bearing, rotation, and a source of the gesture for example where the source of the gesture to which the gesture characteristics relate may include, but not be limited to, a touchpad, a stylus, a mouse, keypad, keyboard, accelerometer or accelerometer derived data, tracked motion of a user or a predetermined portion of a user, an external image source, an external audiovisual source, an external multimedia source, biometric data of a user, and an item of environmental data. An expression or gesture characteristic may be applied to one or more behaviours/aspects of the path and/or casing generation including, but not limited to, applying global chaos, applying local chaos, applying smoothness, damping, applying jitter, defining a number or a count of instances of the path and/or digital element, a weighting, simulated force applied to a digital element, direction, mapping, colour, colour variability, saturation, bleed, feature, grain, concentration, setting rate, viscosity, wetness, opacity and hardness, for example.

Such gesture characteristics or expressions may be automatically determined by the GESGEAP from one or more user interfaces to the GESGEAP which may include, but not be limited to, an image capture/processing system, a gesture recognition system, a stylus, a wearable device, a touchscreen, a keypad, a mouse, a touchpad, a tablet, an accelerometer, and a motion recognition system.

It would be evident that the multiple aspects described and depicted above in respect of embodiments of the invention represent a subset of the features and techniques that can be applied individually or in different combinations.

If a user has enabled what the inventor refers to as an "intelligent path" then a portion of a path and/or casing graphics engine (PA-GE) may be altered to use "saliency" wherein the PA-GE processes the digital content on the same layer and/or on one or more other layers specified, to define the path and/or casing. With a salient path the digital element may track an element of the digital content. For example, a title may have a path defined relative to an object within the digital content (e.g. a person, car, ball, aircraft, etc.). The object within the digital content may be defined by processing the content with one or more image processing algorithms, or another intelligent mapping technology. Alternatively, a user may tag an initial region of the digital content which is then subsequently tracked to define the path.

Optionally, the user may define a path and/or casing using such salient methodologies within one element of digital content but apply them to another digital element within another item of digital content. For example, a user may track the motion of a ball thrown within a highlight reel to establish a path/easing where they subsequently use this for a title or other digital element.

Optionally, an intelligent path or salient path may be established by applying one or more machine learning algorithms or one or more machine learning processes to the digital content. The one or more machine learning algorithms or one or more machine learning processes applied to the digital content may be different in each instance of defining a start point of a path, defining an end point of the path, defining the path, and defining the casing.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps, and means described above may be done in various ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes but is not limited to portable or fixed storage devices, optical storage devices, wireless channels and/or various other mediums capable of storing, containing, or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
   establishing, with a computer system, a defined path for a digital element within a multi-dimensional virtual space where each dimension of the multi-dimensional virtual space relates to either a characteristic of rendering the digital element or a spatial position of the rendered digital element;
   establishing, with the computer system, an easing to be associated with the defined path wherein the easing defines a rate of change along the defined path with respect to at least one of a defined dimension of the multi-dimensional virtual space, a characteristic of the digital element, a characteristic of an item of content within which the digital element is rendered and temporally;
   associating, with the computer system, the defined path and the easing as an effect for subsequent use within a graphics tool; and
   storing the effect within a memory accessible to the computer system.

2. The method according to claim 1, further comprising receiving an indication from a user of another computer system to associate the effect within the graphics tool to a digital element within an item of content within the graphics tool; and
   rendering, to the user upon the another computer system, the digital element within the item of digital content where the digital element is at least one of modified and manipulated in dependence upon the defined path and the easing associated with the effect; wherein
   the defined path defines at least a variation of a second dimension of the multi-dimensional space of a characteristic of rendering the digital element in dependence upon a first dimension of the multi-dimensional space; and
   the easing defines a rate of change of applying the defined path as a function of the first dimension of the multi-dimensional space.

3. The method according to claim 1, further comprising receiving an indication from a user of another computer system to associate the effect within the graphics tool to a digital element within an item of content within the graphics tool; and
   rendering, to the user upon the another computer system, the digital element within the item of digital content where the digital element is at least one of modified and manipulated in dependence upon the defined path and the easing associated with the effect; wherein
   the defined path defines at least a variation of a second dimension of the multi-dimensional space of a characteristic of rendering the digital element in dependence upon a first dimension of the multi-dimensional space; and
   the easing defines a rate of change of applying the defined path temporally between a first point in time within the item of content and a second point in time within the item of content.

4. The method according to claim 1, wherein
   the defined path is defined by a user selecting one of a pre-defined function and a mathematical function; and
   the one of the pre-defined function and the mathematical function has the first parameter established in dependence upon a characteristic of the item of digital content to which the digital element is associated at one or more user defined points within the item of digital content.

5. The method according to claim 1, wherein
   a user defines the defined path by one of a first process, a second process, and a third process;
   in the first process the defined path is defined by the user selecting one of a pre-defined function and a mathematical function, the user selecting the first parameter and the second parameter for the one of the pre-defined function and the mathematical function, and a value of the first parameter is established in dependence upon a characteristic of the item of digital content selected by the user;

in the second process the defined path is defined by the user selecting one of a pre-defined function and a mathematical function; the user selecting the second parameter of the one of the pre-defined function and the mathematical function; and a value of the first parameter is established in dependence upon a characteristic of the viewer viewing the item of digital content with the digital element when it is rendered;

in the third process the defined path is defined by the user selecting one of a pre-defined function and a mathematical function; the user selecting the first parameter and the second parameter for the one of the pre-defined function and the mathematical function, and a value of the first parameter is established in dependence upon one or more items of external data dynamically acquired when the item of digital content with the digital element is rendered to a viewer.

6. The method according to claim 1, wherein one of:
  the defined path is defined by the computer system capturing a gesture of a user whilst a representation of the virtual space is rendered to the user;
  the defined path is defined by the computer system capturing a gesture of the user whilst a representation of the virtual space is rendered to the user and capturing at least one of one or more gesture characteristics of the gesture and one or more expressions associated with the user's generation of the gesture; and
  the defined path is defined by the computer system capturing a gesture of the user whilst a representation of the virtual space is rendered to the user and generating the easing in dependence upon at least one of one or more gesture characteristics of the gesture and one or more expressions associated with the user's generation of the gesture captured by the computer system.

7. The method according to claim 1, wherein
the representation of the virtual space is one of a two-dimensional virtual space, a three-dimensional virtual space and a three-dimensional virtual space rendered as part of an augmented reality environment or a virtual reality environment of a user;

when the representation of the virtual space is the two-dimensional visual space or the three-dimensional space then a first parameter for defining a position relative to a first axis of the virtual space is defined in dependence upon at least one of a user input, a characteristic of the digital element, a characteristic of the item of digital content, and data established from an external source;

when the representation of the virtual space is the two-dimensional visual space or the three-dimensional space then a second parameter for defining a position relative to a second axis of the virtual space is defined in dependence upon at least one of further user input, another characteristic of the digital element, another characteristic of the item of digital content, and other data established from another external source;

when the representation of the virtual space is the three-dimensional space then a third parameter for defining a position relative to a third axis of the virtual space is defined in dependence upon at least one of additional user input, an additional characteristic of the digital element, an additional characteristic of the item of digital content, and additional data established from another external source; and when the representation of the virtual space is the three-dimensional virtual space rendered as part of the augmented reality environment or the virtual reality environment of the user then the defined path and the easing are automatically established in dependence upon tracking at least one of the user and an object associated with the user.

8. The method according to claim 1, further comprising
defining, by a user of the computer system, a start point for the defined path within the item of digital content;
defining, by a user of the computer system, an end point for the defined path within the item of digital content; and
automatically applying the defined path and easing to the digital element over a portion of the item of digital content defined between the start point and the end point.

9. The method according to claim 1, wherein
the digital element is defined at the point of rendering the item of digital content to a viewer; and
the digital element is established in dependence upon at least one of a time of the rendering, a location of the rendering, a preference of the viewer, a distributor of the item of digital content, and a broadcaster of the item of digital content.

10. The method according to claim 1, wherein
the defined path is closed and provides oscillatory behaviour of a characteristic of the digital element.

11. The method according to claim 1, wherein
at least one of:
  a start point for the defined path within the item of digital content is automatically established by the computer system by applying at least one of a machine learning algorithm and a machine learning process to the item of digital content;
  an end point for the defined path within the item of digital content is automatically established by the computer system by applying at least one of another machine learning algorithm and another machine learning process to the item of digital content;
  the defined path within the item of digital content is automatically established by the computer system by applying at least one of a further machine learning algorithm and a further machine learning process to the item of digital content;
  the easing within the item of digital content is automatically established by the computer system by applying at least one of an additional machine learning algorithm and an additional machine learning process to the item of digital content.

12. The method according to claim 1, further comprising
establishing a number of repetitions of the defined path to be employed in the rendering of the digital element;
establishing a number of times the easing is to be applied to the number of repetitions of the defined path.

13. The method according to claim 1, wherein
the defined path is defined by a user of the computer system selecting one of a pre-defined function and a mathematical function;
the one of the pre-defined function and the mathematical function has the first parameter established in dependence upon a characteristic of the item of digital content to which the digital element is associated at one or more user defined points within the item of digital content;

the easing is defined by one of the user selecting one of another pre-defined function and selecting another mathematical function and capturing a gesture of the user; and when the easing is defined by the user selecting one of the another pre-defined function and the another mathematical function the user also defines a further characteristic of the item of digital content as an independent variable for the one of the another pre-defined function and another mathematical function.

14. The method according to claim 1, wherein
the defined path is defined by a user of the computer system with one of a first process, a second process and a third process;
in each of the first process, the second process and the third process the user selects one of a pre-defined function and a mathematical function;
in the first process the user selects the first parameter and the second parameter for the one of the pre-defined function and the mathematical function and a value of the first parameter is established in dependence upon a characteristic of the item of digital content selected by the user;
in the second process the user selects the second parameter of the one of the pre-defined function and the mathematical function and a value of the first parameter is established in dependence upon a characteristic of a viewer viewing the item of digital content with the digital element when it is rendered;
in the third process the user selects the first parameter and the second parameter for the one of the pre-defined function and the mathematical function and a value of the first parameter is established in dependence upon one or more items of external data dynamically acquired when the item of digital content with the digital element is rendered to a viewer; and
in each of the first process, the second process and the third process:
the easing is defined by one of the user selecting one of another pre-defined function and selecting another mathematical function and capturing a gesture of the user; and
when the easing is defined by the user selecting one of the another pre-defined function and the another mathematical function the user also defines a further characteristic of the item of digital content as an independent variable for the one of the another pre-defined function and another mathematical function.

15. The method according to claim 1, further comprising
receiving an indication from a user of another computer system to associate the effect within the graphics tool to a digital element within an item of content within the graphics tool; and
rendering, to the user upon the another computer system, the digital element within the item of digital content where the digital element is at least one of modified and manipulated in dependence upon the defined path and the easing associated with the effect; wherein
at least one of:
the digital element is established by one or more selections of the user and comprises one of a brush stroke, an impression or series of impressions of a mark making tool, a particle brush, a stroke tapestry, a digital image, a digital animation, an item of digital video content, an item of digital audio content, an item of digital audiovisual content, and an item of digital text content;
at least one of the defined path and the easing can be manipulated during rendering to the user and modifications to the at least one of the path and the easing are made in dependence upon user's manipulations; and
the easing is defined by the user selecting a further characteristic of the item of digital content.

16. The computer executable instructions according to claim 1, wherein
the process further comprises:
receiving an indication from a user of another computer system to associate the effect within the graphics tool to a digital element within an item of content within the graphics tool; and
rendering, to the user upon the another computer system, the digital element within the item of digital content where the digital element is at least one of modified and manipulated in dependence upon the defined path and easing associated with the effect;
the defined path defines at least a variation of a second dimension of the multi-dimensional space of a characteristic of rendering the digital element in dependence upon a first dimension of the multi-dimensional space; and
the easing defines a rate of change of applying the defined path as a function of the first dimension of the multi-dimensional space.

17. The computer executable instructions according to claim 1, wherein
the process further comprises:
receiving an indication from a user of another computer system to associate the effect within the graphics tool to a digital element within an item of content within the graphics tool; and
rendering, to the user upon the another computer system, the digital element within the item of digital content where the digital element is at least one of modified and manipulated in dependence upon the defined path and the easing associated with the effect;
the defined path defines at least a variation of a second dimension of the multi-dimensional space of a characteristic of rendering the digital element in dependence upon a first dimension of the multi-dimensional space; and
the easing defines a rate of change of applying the defined path temporally between a first point in time within the item of content and a second point in time within the item of content.

18. The computer executable instructions according to claim 1, wherein
the defined path is defined by a user selecting one of a pre-defined function and a mathematical function; and
the one of the pre-defined function and the mathematical function has the first parameter established in dependence upon a characteristic of the item of digital content to which the digital element is associated at one or more user defined points within the item of digital content.

19. Computer executable instructions stored upon a non-volatile, non-transitory storage medium where the executable instructions when executed by one or more processors of a computer system configure the computer system to execute a process comprising:

establishing, with a computer system, a defined path for a digital element within a multi-dimensional virtual space where each dimension of the multi-dimensional virtual space relates to either a characteristic of rendering the digital element or a spatial position of the rendered digital element;

establishing, with the computer system, an easing to be associated with the defined path wherein the easing defines a rate of change along the evolution of the defined path with respect to at least one of a defined dimension of the multi-dimensional space, a characteristic of the digital element, a characteristic of an item of content within which the digital element is rendered and temporally;

associating, with the computer system, the defined path and the easing as an effect for subsequent use within a graphics tool; and storing the effect within a memory accessible to the computer system.

20. The computer executable instructions according to claim 19, wherein a user defines the defined path by one of a first process, a second process, and a third process;

in the first process the defined path is defined by the user selecting one of a pre-defined function and a mathematical function, the user selecting the first parameter and the second parameter for the one of the pre-defined function and the mathematical function, and a value of the first parameter is established in dependence upon a characteristic of the item of digital content selected by the user;

in the second process the defined path is defined by the user selecting one of a pre-defined function and a mathematical function; the user selecting the second parameter of the one of the pre-defined function and the mathematical function; and a value of the first parameter is established in dependence upon a characteristic of the viewer viewing the item of digital content with the digital element when it is rendered;

in the third process the defined path is defined by the user selecting one of a pre-defined function and a mathematical function; the user selecting the first parameter and the second parameter for the one of the pre-defined function and the mathematical function, and a value of the first parameter is established in dependence upon one or more items of external data dynamically acquired when the item of digital content with the digital element is rendered to a viewer.

* * * * *